US012694581B2

(12) United States Patent
Enomoto et al.

(10) Patent No.: US 12,694,581 B2
(45) Date of Patent: Jul. 28, 2026

(54) GENERATING ALPHA MATTES FOR DIGITAL IMAGES AND VIDEOS USING POLARIZED SCREEN MATTING WITH WELL-POSED PIXEL FILTERING AND POLARIMETRIC MATTING LAPLACIAN

(71) Applicant: Adobe Inc., San Jose, CA (US)

(72) Inventors: Kenji Enomoto, Anjo City (JP); Brian Price, San Jose, CA (US); Gavin Stuart Peter Miller, Los Altos, CA (US); Tenell Rhodes, Campbell, CA (US)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 18/900,377

(22) Filed: Sep. 27, 2024

(65) Prior Publication Data

US 2026/0094309 A1 Apr. 2, 2026

(51) Int. Cl.
*G06T 11/00* (2026.01)
*G06T 5/20* (2006.01)
(Continued)

(52) U.S. Cl.
CPC ............... *G06T 11/00* (2013.01); *G06T 5/20* (2013.01); *G06T 5/50* (2013.01); *G06T 7/74* (2017.01);
(Continued)

(58) Field of Classification Search
CPC ... G06T 11/00; G06T 5/20; G06T 5/50; G06T 7/74; G06T 2207/20081; G06T 2207/20221
See application file for complete search history.

(56) References Cited

U.S. PATENT DOCUMENTS 5,613,048 A * 3/1997 Chen ..................... G06T 15/205
345/473
7,139,423 B1 * 11/2006 Nicolas .................. G06T 7/579
382/106
(Continued)

OTHER PUBLICATIONS

Del Molino, F., & Muñoz, A. (2019). Polarization mapping. Computers & Graphics, 83, 42-50.*

(Continued)

*Primary Examiner* — Sarah Lhymn
(74) *Attorney, Agent, or Firm* — Keller Preece PLLC

(57) ABSTRACT

The present disclosure relates to systems, non-transitory computer-readable media, and methods for generating alpha mattes for digital images utilizing polarized screen matting. In particular, in some embodiments, the disclosed systems obtain a plurality of background images of a background polarized light source and a plurality of polarized digital images portraying a foreground subject backlit by the background polarized light source. In addition, in some embodiments, the disclosed systems determine well-posed pixels of the plurality of polarized digital images by: selecting, utilizing a polarized pixel filtering model, pixels devoid of polarized foreground light; or selecting, utilizing a phase angle filtering model, polarized pixels comprising phase angles of polarization distinct from a background phase angle of polarization in the plurality of background images. Moreover, in some embodiments, the disclosed systems generate an alpha matte from alpha matte values for the well-posed pixels utilizing a polarimetric matting Laplacian model.

20 Claims, 10 Drawing Sheets

(51) Int. Cl.
　　G06T 5/50　　　　(2006.01)
　　G06T 7/73　　　　(2017.01)
(52) U.S. Cl.
　　CPC .............. *G06T 2207/20081* (2013.01); *G06T 2207/20221* (2013.01)

(56)　　　　　　References Cited

U.S. PATENT DOCUMENTS

| | | | | |
|---|---|---|---|---|
| 9,786,055 | B1 * | 10/2017 | Dsouza | ...................... G06T 7/90 |
| 11,792,538 | B2 * | 10/2023 | Venkataraman | ....... H04N 5/265 |
| | | | | 348/222.1 |
| 2005/0126505 | A1 * | 6/2005 | Gallager | ................ A01K 61/54 |
| | | | | 119/234 |
| 2005/0163367 | A1 * | 7/2005 | Zhang | ........................ G06T 7/97 |
| | | | | 382/154 |
| 2017/0223339 | A1 * | 8/2017 | Kondo | ....................... G06T 7/55 |
| 2018/0048830 | A1 * | 2/2018 | Venkataraman | ........ G06T 7/557 |
| 2020/0098130 | A1 * | 3/2020 | Porter | ................... G06T 7/0002 |
| 2020/0106945 | A1 * | 4/2020 | Hsieh | ...................... G06T 11/60 |
| 2022/0392165 | A1 * | 12/2022 | Villalon | .................. G06T 7/187 |
| 2023/0169658 | A1 | 6/2023 | Rhodes et al. | |

OTHER PUBLICATIONS

Johnson, J., Varnousfaderani, E. S., Cholakkal, H., & Rajan, D. (2016). Sparse coding for alpha matting. IEEE Transactions on Image Processing, 25(7), 3032-3043.*

Sindeev, M., Konushin, A., & Rother, C. (Nov. 2012). Alpha-flow for video matting. In Asian Conference on Computer Vision (pp. 438-452). Berlin, Heidelberg: Springer Berlin Heidelberg.*

Wang, J. (2017). Image and Video Matting. In Image Processing and Analysis with Graphs: Theory and Practice (pp. 237-262). CRC Press.*

Actioncamera.com "Calibrite ColorChecker Passport Duo". [online] 8 pages, [Retrieved on Jan. 13, 2025] Retrieved from the Internet, <URL: https://www.actioncamera.com/shop/calibrite-colorchecker-passport-duo/45deb940-2716-013b-834b-00163ecd2826>.

Alvy Ray Smith and James F Blinn. "Blue Screen Matting". In SIGGRAPH 96 Conference Proceedings, 10 pages, Aug. 1996.

Anat Levin, Dani Lischinski, and YairWeiss. "A Closed Form Solution to Natural Image Matting". In IEEE Transactions on Pattern Analysis and Machine Intelligence (TPAMI), 30(2):228-242, Feb. 2008.

Christoph Rhemann, Carsten Rother, Jue Wang, Margrit Gelautz, Pushmeet Kohli, and Pamela Rott. "A Perceptually Motivated Online Benchmark for Image Matting". In IEEE Conference on Computer Vision and Pattern Recognition (CVPR), pp. 1826-1833, 2009.

Dmitriy Smirnov, Chloe LeGendre, Xueming Yu, and Paul Debevec. "Magenta Green Screen: Spectrally Multiplexed Alpha Matting with Deep Colorization". In the Digital Production Symposium (DigiPro), 13 pages, arXiv preprint arXiv:2306313702v1, Jun. 23, 2023.

Dongliang Cheng et al. "Illuminant Estimation for Color Constancy: Why spatial domain methods work and the role of the color distribution," J. Opt. Soc. Am. A 31, 1049-1058 (2014). Retrieved from the Internet: <URL: http://www.cse.yorku.ca/~mbrown/pdf/ColorConstancyJOSAv10.pdf>.

EdmondOptics.com "BFS-U3-51S5P-C USB 3.1". [online] 3 pages, [Retrieved on Jan. 13, 2025] Retrieved from the Internet, <URL: https://www.edmundoptics.com/p/bfs-u3-51s5p-c-usb3-blackflyreg-s-polarization-camera/41357>.

George Gabriel Stokes. "On the Composition and Resolution of Streams of Polarized Light from different Sources". In Proceedings of the Cambridge Philosophical Society: Mathematical and Physical Sciences. vol. 9 of Transactions of the Cambridge Philosophical Society, 14 pages, Feb. 16, 1852.

Hao Lu, Yutong Dai, Chunhua Shen, and Songcen Xu. "Indices Matter: Learning to Index for Deep Image Matting". In ICCV, pp. 3266-3275, 2019.

Hisense-USA.com "55" 4K UHD Android Smart TV" (2021). [online] 5 pages, [Retrieved on Jan. 13, 2025] Retrieved from the Internet, <URL: https://www.hisense-usa.com/support/55a6g-55-4k-uhd-hisense-android-smart-tv-2021>.

Ido Omer and Michael Werman. "Color Lines: Image Specific Color Representation". In Proceedings of the 2004 IEEE Computer Society Conference on Computer Vision and Pattern Recognition (CVPR), pp. 1-8, 2004.

Jiachen Li, Vidit Goel, Marianna Ohanyan, Shant Navasardyan, YunchaoWei, and Humphrey Shi. "VMFormer: End-to-End Video Matting with Transformer". 10 pages, arXiv preprint arXiv:2208. 12801v2, Nov. 30, 2022.

Jingwei Tang, Yagiz Aksoy, Cengiz Oztireli, Markus Gross, and Tunc Ozan Aydin. "Learning-based Sampling for Natural Image Matting". In IEEE/CVF Conference on Computer Vision and Pattern Recognition (CVPR), pp. 3055-3063, 2019.

Jizhizi Li, Jing Zhang, and Dacheng Tao. "Deep Image Matting: A Comprehensive Survey". 20 pages, arXiv preprint arXiv:2304. 04672v1, Apr. 10, 2023.

Mikhail Erofeev, Yury Gitman, Dmitriy Vatolin, Alexey Fedorov, and JueWang. "Perceptually Motivated Benchmark for Video Matting". In the British Machine Vision Association (BMVC), 12 pages, 2015.

Miki Morimatsu, Yusuke Monno, Masayuki Tanaka, and Masatoshi Okutomi. "Monochrome and Color Polarization Demosaicking Based on Intensity-Guided Residual Interpolation". IEEE Sensors Journal, 21(23):26985-26996, Dec. 1, 2021.

Morgan McGuire et al.; "Real-time Triangulation Matting using Passive Polarization", 2006.

Morgan McGuire, Wojciech Matusik, and William Yerazunis. "Practical, Real-time Studio Matting using Dual Imagers". In Eurographics Conference on Rendering Techniques, 10 pages, 2006.

Ning Xu, Brian Price, Scott Cohen, and Thomas Huang. "Deep Image Matting". In IEEE/CVF Conference on Computer Vision and Pattern Recognition (CVPR), pp. 2970-2979, 2017.

Qifeng Chen, Dingzeyu Li, and Chi-Keung Tang. "KNN Matting". IEEE Transactions on Pattern Analysis and Machine Intelligence (TPAMI), vol. 35, No. 9, 14 pages, Sep. 2013.

Shanchuan Lin, Andrey Ryabtsev, Soumyadip Sengupta, Brian L Curless, Steven M Seitz, and Ira Kemelmacher-Shlizerman. "Real-Time High-Resolution Background Matting". In CVPR, pp. 8762-8771, 2021.

Shaofan Cai, Xiaoshuai Zhang, Haoqiang Fan, Haibin Huang, Jiangyu Liu, Jiaming Liu, Jiaying Liu, Jue Wang, and Jian Sun. "Disentangled Image Matting". In ICCV, pp. 8819-8828, 2019.

Soumyadip Sengupta, Vivek Jayaram, Brian Curless, Steve Seitz, and Ira Kemelmacher- Shlizerman. "Background Matting: The World is Your Green Screen". In IEEE/CVF Conference on Computer Vision and Pattern Recognition (CVPR), pp. 2291-2300, 2020.

Stefan Rahmann and Nikos Canterakis. "Reconstruction of Specular Surfaces using Polarization Imaging". In Proceedings of the 2001 IEEE Computer Society Conference on Computer Vision and Pattern Recognition (CVPR), pp. I-149-I-155, 2001.

Thomas Porter and Tom Duff. "Compositing Digital Images". ACM SIGGRAPH Computer Graphics, vol. 18, No. 3, pp. 253-259, Jul. 1984.

Tiantian Wang, Sifei Liu, Yapeng Tian, Kai Li, and Ming- Hsuan Yang. "Video Matting via Consistency-Regularized Graph Neural Networks". In IEEE/CVF International Conference on Computer Vision (ICCV), pp. 4902-4911, 2021.

Wei-Lun Huang and Ming-Sui Lee. "End-to-end Video Matting with Trimap Propagation". In CVPR, pp. 14337-14247, 2023.

Xiaoyong Shen, Xin Tao, Hongyun Gao, Chao Zhou, and Jiaya Jia. "Deep Automatic Portrait Matting". In European Conference on Computer Vision (ECCV), Springer, pp. 92-107, 2016.

Yagiz Aksoy, Tunc, Ozan Aydin, Marc Pollefeys, and Aljosa Smollc. "Interactive High-Quality Green-Screen Keying via Color Unmixing". ACM Transactions on Graphics (TOG), 36(4):1, 2016.

(56) References Cited

OTHER PUBLICATIONS

Yanan Sun, Chi-Keung Tang, and Yu-Wing Tai. "Semantic Image Matting". In IEEE/CVF Conference on Computer Vision and Pattern Recognition (CVPR), pp. 11120-11129, 2021.

Yanan Sun, Guanzhi Wang, Qiao Gu, Chi-Keung Tang, and Yu-Wing Tai. "Deep Video Matting via Spatio-Temporal Alignment and Aggregation". In IEEE/CVF Conference on Computer Vision and Pattern Recognition (CVPR), pp. 6975-6984, 2021.

Yunke Zhang, Chi Wang, Miaomiao Cui, Peiran Ren, Xuansong Xie, Xian-Sheng Hua, Hujun Bao, Qixing Huang, and Weiwei Xu. "Attention-guided Temporally Coherent Video Object Matting". In Proceedings of the 29th ACM International Conference on Multimedia (ACM MM), 10 pages, arXiv preprint arXiv:2105.11427v3, Jul. 29, 2021.

Yutong Dai, Brian Price, He Zhang, and Chunhua Shen. "Boosting Robustness of Image Matting with Context Assembling and Strong Data Augmentation". In CVPR, pp. 11707-11716, 2022.

U.S. Appl. No. 18/177,491, Apr. 17, 2025, Notice of Allowance.

* cited by examiner

Obtaining A Plurality Of Polarized Digital Images Portraying A Foreground Subject Backlit By A Background Polarized Light Source *802*

Determining Well-Posed Pixels Of The Plurality Of Polarized Digital Images *804*

Generating An Alpha Matte For The Plurality Of Polarized Digital Images From Alpha Matte Values For The Well-Posed Pixels *806*

Computing Device
900

Processor
902

Memory
904

Storage
906

I/O Interface
908

Communication Interface
910

912

GENERATING ALPHA MATTES FOR DIGITAL IMAGES AND VIDEOS USING POLARIZED SCREEN MATTING WITH WELL-POSED PIXEL FILTERING AND POLARIMETRIC MATTING LAPLACIAN

BACKGROUND

Recent years have seen developments in hardware and software platforms for implementing digital image or digital video matting processes. For example, matting systems can analyze digital images to combine portions of a digital image with an alternative background. For example, chroma key compositing involves capturing video animation of a foreground subject in front of a green background or a blue background, and replacing the green or blue color with the alternative background. Despite these developments, the technical field suffers from a number of technical deficiencies, including inaccuracy in generating unrealistic and imprecise composite images, inflexibility of operation, and inefficiency in utilizing excessive time and computing resources.

BRIEF SUMMARY

Embodiments of the present disclosure provide benefits and/or solve one or more problems in the art with systems, non-transitory computer-readable media, and methods for generating alpha mattes for digital images utilizing polarized screen matting with intelligent well-posed pixel filtering and/or a polarimetric matting Laplacian. In some embodiments, the disclosed systems obtain a plurality of polarized digital images portraying a foreground subject backlit by a background polarized light source. Moreover, in some embodiments, the disclosed systems determine well-posed pixels of the plurality of polarized digital images. For example, in some implementations, the disclosed systems utilize a polarized pixel filtering model to determine well-posed pixels including pixels devoid of polarized foreground light. Additionally, in some implementations, the disclosed systems utilize a phase angle filtering model to determine well-posed pixels including pixels with polarized foreground light that has a phase angle of polarization distinct from a background phase angle of polarization. Moreover, in some embodiments, the disclosed systems generate alpha matte values for the well-posed pixels. Furthermore, in some implementations, the disclosed systems utilize a polarimetric matting Laplacian model to generate an alpha matte for the plurality of polarized digital images based on the alpha matte values for the well-posed pixels and light intensities of the plurality of polarized digital images.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
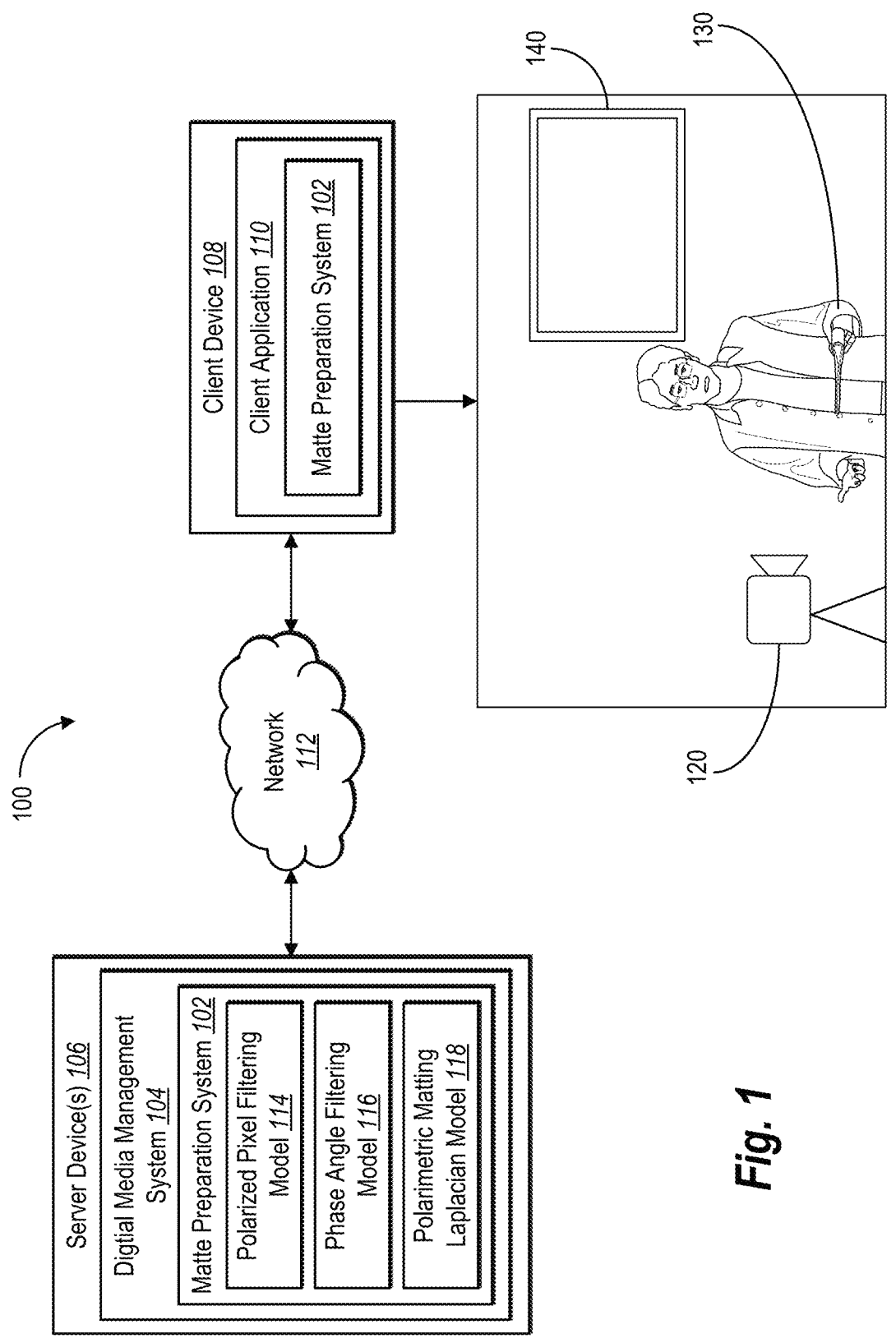
FIG. 1 illustrates a diagram of an environment in which a matte preparation system operates in accordance with one or more embodiments.

This disclosure describes one or more embodiments of a matte preparation system that generates alpha mattes for digital images utilizing polarized screen matting with intelligent well-posed pixel filtering and a polarimetric matting Laplacian. In some embodiments, the matte preparation system obtains a plurality of polarized digital images portraying a foreground subject backlit by a background polarized light source as well as a plurality of background images of the background polarized light source. Moreover, in some embodiments, the matte preparation system utilizes one or more well-posed pixel filtering models to determine well-posed pixels of the plurality of polarized digital images. For example, in some implementations, the matte preparation system utilizes a polarized pixel filtering model to determine well-posed pixels devoid of polarized foreground light. Additionally, in some implementations, the matte preparation system utilizes a phase angle filtering model to determine well-posed pixels including pixels with polarized foreground light that has a phase angle of polarization distinct from a background phase angle of polarization. Furthermore, in one or more implementations, the matte preparation system propagates alpha values of these well-posed pixels utilizing a polarimetric matting Laplacian model to generate improved alpha mattes relative to conventional systems.

As just mentioned, in one or more implementations, the matte preparation system obtains or captures polarized digital images. In particular, the matte preparation system can utilize a polarized camera to capture a plurality of polarized digital images (e.g., 4 polarized digital images having different phase angles). In one or more implementations, the matte preparation system captures polarized background digital images of a scene lit by a background polarized light source. The matte preparation system also captures polarized background digital images of foreground objects in the scene backlit by the background polarized light source.

Upon capturing these polarized digital images, the matte preparation system can utilize the polarized digital images to generate an accurate alpha matte for the foreground and background captured in the polarized digital images. Specifically, in some implementations, the matte preparation system utilizes well-posed pixel filtering models to account for polarized foreground reflections. Indeed, polarized light reflected to foreground pixels (e.g., pixels that are not well-posed) can cause perceptible alpha matte errors. Accordingly, in one or more implementations, the matte preparation system utilizes well-posed pixel filters to identify foreground pixels that do not portray reflected polarized light that will undermine the accuracy of the resulting alpha matte.

For example, in one or more implementations, the matte preparation system utilizes a polarized pixel filtering model that distinguishes between polarized or unpolarized light in foreground pixels. For instance, the polarized pixel filtering model can analyze foreground polarized light intensities and background polarized light intensities from the polarized digital images to estimate well-posed pixels that do not reflect polarized light from the foreground. The matte preparation system can utilize a variety of approaches to filter polarized foreground pixels, including a least squares formulation and a Bayesian framework, among others.

In addition, in one or more embodiments, the matte preparation system utilizes a phase angle filtering model to identify well-posed pixels. The phase angle filtering model can identify well-posed pixels from the foreground that include reflected polarized light, but at a sufficiently different phase angle so as not to undermine accuracy of the resulting alpha matte. Indeed, even if foreground pixels reflect polarized light, so long as that polarized light is sufficiently distinct from phase angles of the polarized background light, such pixels are still well-posed. In one or more implementations, the phase angle filtering model identifies these well-posed pixels by comparing phase angles of polarized light from foreground pixels and background pixels (utilizing a phase angle threshold) to identify well-posed pixels.

Upon identifying well-posed pixels, in one or more implementations, the matte preparation system utilizes the well-posed pixels to generate an alpha matte from the polarized digital images. Indeed, in one or more embodiments, the matte preparation system utilizes a polarimetric matting Laplacian model to propagate alpha values of the well-posed pixels to other pixels based on polarized light intensities from the polarized digital images. Specifically, the matte preparation system can analyze pixel windows, preserve alpha values of well-posed pixels, and determine alpha values of other pixels utilizing the polarized light represented within a polarimetric matting Laplacian matrix.

Although some systems can generate masks for compositing images or video, such systems have a number of problems in relation to accuracy, efficiency, and flexibility of operation. For instance, these systems inaccurately generate masks for a foreground subject. Specifically, existing systems often omit portions of the foreground subject that should be retained in the composited image and/or retain portions of the original background that should be omitted from the composited image. Accordingly, existing systems often generate composite images or videos that include unrealistic artifacts. Furthermore, existing systems poorly capture fine details, such as motion blur and human hair.

Additionally, existing systems are inefficient. To illustrate, these systems often require extensive time, memory, and processing power to generate a composited image or video. Indeed, existing systems require significant time and computing resources to generate masks at each individual frame and overlay the foreground subject over the alternative background. Thus, preparation of training datasets for video matting machine learning models utilizing existing systems is cost prohibitive due to substantial computational resources required.

Furthermore, existing systems are inflexible in creating a composited image or video, requiring many user interactions (e.g., many user inputs, clicks, operations, manual edits, etc.). For instance, existing systems require numerous user inputs to setup a video, mask the video, crop the video, overlay the video onto an alternative background, and edit errors in the resulting composited video (such as artifacts from the original background or omissions of portions of the foreground subject). Thus, preparation of training datasets for video matting machine learning models utilizing existing systems is labor prohibitive. The sheer volume of assets that need to be prepared for a high-quality, large-scale video matting dataset often requires hundreds of hours of manual frame-by-frame edits.

Furthermore, traditional solutions to build video matting datasets are too slow and too manual (e.g., stop-motion video), use over-constrained systems (e.g., static objects, high contrast subjects on a simple background, etc.), or use compromised ground-truth assets (e.g., assets having hand-painted alpha values, assets without motion blur, etc.). Therefore, existing solutions are not practical for large-scale video datasets that consist of hundreds or thousands of frames. Indeed, for this reason, in this field there is a lack of available training data reflecting digital videos and corresponding alpha matte animations. The inaccuracy and inflexibility of existing systems has made ground truth alpha matte animations and training datasets inordinately difficult to generate. Moreover, existing systems cannot efficiently composite large datasets of numerous images or videos with fine levels of detail (e.g., fine hair) or rapidly moving objects (e.g., blurred objects), which precludes existing systems from operating at scale.

The matte preparation system provides many advantages and benefits over existing systems and methods. For example, by utilizing polarized digital images in conjunction with a polarized pixel filtering model, a phase angle filtering model, and/or a polarimetric matting Laplacian model, the matte preparation system improves accuracy of alpha mattes and modified digital images and videos relative to existing systems. Specifically, in some embodiments, the matte preparation system reduces or eliminates artifacts from reflected light off a foreground subject by determining well-posed pixels in a digital image portraying the foreground subject and solving a polarimetric matting Laplacian objective to extend alpha matte values to those pixels that are not well-posed.

Additionally, by performing one or more of the disclosed methods, the matte preparation system increases efficiency of image matting and/or video matting dataset preparation relative to existing systems. Specifically, in some embodiments, the matte preparation system utilizes a single polarization camera to capture dynamic scenes backlit by an LCD television or monitor. Moreover, in some implementations, the matte preparation system exploits the polarization channel with a polarized pixel filtering model, a phase angle filtering model, and/or a polarimetric matting Laplacian model to compute per-pixel opacity of the target scene, including the transparency of fine details, translucent objects, and optical/motion blur. Furthermore, the matte preparation system leverages polarization clues to robustly detect indistinguishable pixels, and extract alpha matte values at polarized foreground reflections with the polarimetric matting Laplacian. The disclosed methods allow for computationally efficient extraction of ground-truth-quality alpha mattes. Thus, the matte preparation system can produce high-quality video and image training assets much more efficiently than traditional methods.

Furthermore, the matte preparation system can offer increased flexibility of operation over existing systems. In particular, in some embodiments, the matte preparation system alleviates setup steps required by existing systems (for example, chroma key compositing systems require careful setup of lighting to ensure that the green screen is adequately and uniformly lit). To illustrate, in some implementations, by utilizing polarized digital videos, the matte preparation system composites detailed videos without a need for careful lighting setup. Moreover, the matte preparation system also flexibly operates across a wide range of digital videos, including videos with fine detail or rapidly moving objects. Utilizing some or all of the disclosed techniques, the matte preparation system can produce high-quality ground-truth alpha mattes for finely detailed and varyingly transparent still or moving objects in images and videos.

Additional detail will now be provided in relation to illustrative figures portraying example embodiments and implementations of a matte preparation system. For example, FIG. 1 illustrates a system 100 (or environment) in which a matte preparation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a digital media management system 104 that further includes the matte preparation system 102. In some embodiments, the matte preparation system 102 generates alpha mattes for digital images. Moreover, in some embodiments, the matte preparation system 102 utilizes one or more matting models (e.g., an alpha matting model comprising a polarized pixel filtering model 114, a phase angle filtering model 116, and/or a polarimetric matting Laplacian model 118) to determine well-posed pixels of polarized digital images and to generate alpha mattes for polarized digital images. For example, in some implementations, the matte preparation system 102 utilizes the matting models to determine well-posed pixels of a plurality of polarized digital images and generate an alpha matte for the plurality of polarized digital images. Furthermore, in some implementations, the matte preparation system 102 generates modified digital images from the polarized digital images utilizing the alpha mattes. In some embodiments, the server device(s) 106 includes, but is not limited to, a computing device (such as explained below with reference to FIG. 9).

In some instances, the matte preparation system 102 receives a request (e.g., from the client device 108) to generate an alpha matte for a digital image. For example, the request includes an instruction to capture a digital image or a digital video (or receive the digital image or the digital video from another system) portraying a foreground subject, to generate an alpha matte for the digital image or digital video, and/or to modify the digital image or the digital video to overlay the foreground subject over a replacement background.

In some embodiments, the matte preparation system 102 captures, utilizing a camera 120, a digital video (or digital image) portraying an animation (or still shot) of a foreground subject 130 and polarized light from a polarized light source 140 behind the foreground subject 130. For example, the camera 120 comprises one or more polarized filters to capture polarized light of various polarization angles. In this manner, the matte preparation system 102 captures one or more polarized digital videos (or polarized digital images), each polarized digital video (or polarized digital image) portraying the same scene, but with different light intensities depending on the polarization angle of the light captured in each of the polarized digital videos (or polarized digital images) (i.e., depending on the polarization angle of the polarized filter associated with the particular polarized digital video or polarized digital image).

Therefore, in some embodiments, the system 100 includes the camera 120 and the polarized light source 140 for use by the matte preparation system 102. In one or more embodiments, including the illustrated embodiment, the matte preparation system 102 communicates with the camera 120 and/or the polarized light source 140 through the client device 108. In some embodiments, the matte preparation system 102 communicates directly with the camera 120 and/or the polarized light source 140 through the network 112. In some embodiments, the matte preparation system 102 stores the digital videos or digital images (e.g., the polarized digital videos) captured by the camera 120. In some embodiments, the matte preparation system 102 receives the polarized digital videos or polarized digital images from another system.

Some embodiments of server device(s) 106 perform a variety of functions via the digital media management system 104 on the server device(s) 106. To illustrate, the server device(s) 106 (through the matte preparation system 102 on the digital media management system 104) performs functions such as, but not limited to, obtaining a plurality of polarized digital images, determining well-posed pixels of the plurality of polarized digital images, and generating an alpha matte for the plurality of polarized digital images from alpha matte values for the well-posed pixels. In some embodiments, the server device(s) 106 utilizes the polarized pixel filtering model 114 and/or the phase angle filtering model 116 to determine the well-posed pixels in the plurality of polarized digital images. Moreover, in some embodiments, the server device(s) 106 utilizes the polarized pixel filtering model 114, the phase angle filtering model 116, and/or the polarimetric matting Laplacian model 118 to generate the alpha matte for the plurality of polarized digital images.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 9. Some embodiments of client device 108 perform a variety of functions via a client application 110 on client device 108. For example, the client device 108 (through the client application 110) performs functions such as, but not limited to, obtaining a plurality of polarized digital images, determining well-posed pixels of the plurality of polarized digital images, and generating an alpha matte for the plurality of polarized digital images from alpha matte values for the well-posed pixels. In some embodiments, the client device 108 utilizes the polarized pixel filtering model 114 and/or the phase angle filtering model 116 to determine the well-posed pixels in the plurality of polarized digital images. Moreover, in some embodiments, the client device 108 utilizes the polarized pixel filtering model 114, the phase angle filtering model 116, and/or the polarimetric matting Laplacian model 118 to generate the alpha matte for the plurality of polarized digital images.

To access the functionalities of the matte preparation system 102 (as described above and in greater detail below), in one or more embodiments, a user interacts with the client application 110 on the client device 108. For example, the client application 110 includes one or more software applications (e.g., to prepare alpha mattes for digital images in accordance with one or more embodiments described herein) installed on the client device 108, such as a digital media management application, a video editing application, an image editing application, and/or a video matte preparation application. In certain instances, the client application 110 is hosted on the server device(s) 106. Additionally, when hosted on the server device(s) 106, the client application 110 is accessed by the client device 108 through a web browser and/or another online interfacing platform and/or tool. Furthermore, in some embodiments, the client device 108, the server device(s) 106, or another system host one or more databases including digital data.

As illustrated in FIG. 1, in some embodiments, the matte preparation system 102 is hosted by the client application 110 on the client device 108 (e.g., additionally, or alternatively to being hosted by the digital media management system 104 on the server device(s) 106). For example, the matte preparation system 102 performs the alpha matte generation techniques described herein on the client device 108.

Further, although FIG. 1 illustrates the matte preparation system 102 being implemented by a particular component and/or device within the system 100 (e.g., the server device(s) 106 and/or the client device 108), in some embodiments the matte preparation system 102 is implemented, in whole or in part, by other computing devices and/or components in the system 100. For instance, in some embodiments, the matte preparation system 102 is implemented on another client device. More specifically, in one or more embodiments, the description of (and acts performed by) the matte preparation system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a request to generate an alpha matte for a digital image). In response, the matte preparation system 102 on the server device(s) 106 performs operations described herein to generate alpha mattes for digital images. The server device(s) 106 provides the output or results of the operations (e.g., alpha mattes, modified digital images, etc.) to the client device 108. As another example, in some implementations, the matte preparation system 102 on the client device 108 performs operations described herein to generate alpha mattes for digital images. The client device 108 provides the output or results of the operations (e.g., alpha mattes, modified digital images, etc.) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and communicates using any communication platforms and technologies suitable for transporting data and/or communication signals, examples of which are described with reference to FIG. 9. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As mentioned, in some embodiments, the matte preparation system 102 generates alpha mattes for digital images. For instance, FIG. 2 illustrates the matte preparation system 102 generating an alpha matte for a plurality of polarized digital images portraying a foreground subject in accordance with one or more embodiments.

Figure 2:
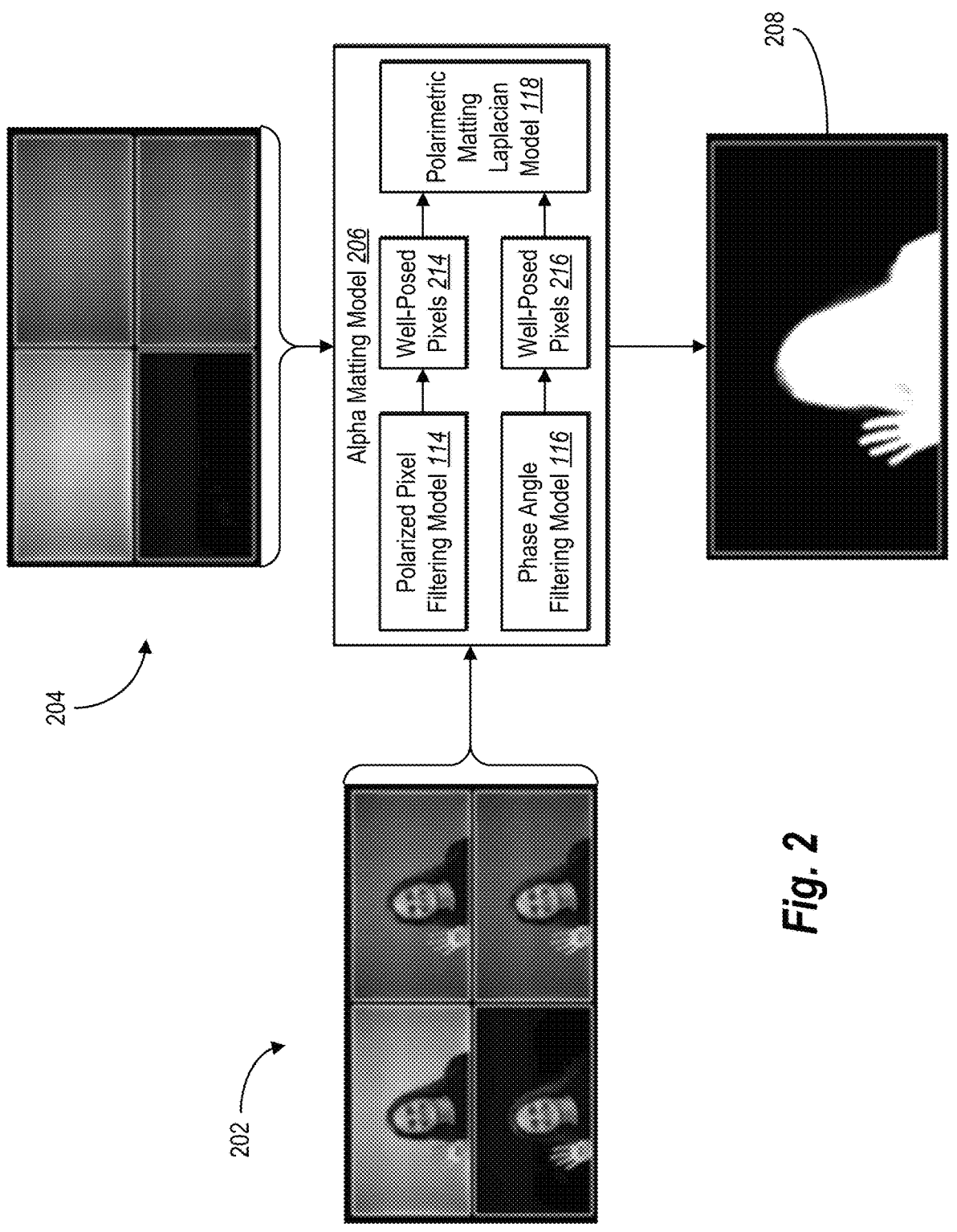
FIG. 2 illustrates the matte preparation system generating an alpha matte for a plurality of polarized digital images portraying a foreground subject in accordance with one or more embodiments.

Specifically, FIG. 2 shows the matte preparation system 102 obtaining a plurality of polarized digital images 202 portraying a foreground subject backlit by a background polarized light source. In addition, FIG. 2 shows the matte preparation system 102 obtaining a plurality of background images 204 of the background polarized light source. Moreover, in some embodiments, the matte preparation system 102 processes the plurality of polarized digital images 202 and the plurality of background images 204 through an alpha matting model 206 to generate an alpha matte 208 for the plurality of polarized digital images 202. As shown in FIG. 2, the alpha matte represents a region (or regions) of the plurality of polarized digital images that depicts the foreground subject.

An alpha matte includes a map of values representing foreground (e.g., a binary one), background (e.g., a binary zero), and combination/alpha values (e.g., a value between zero and one). For instance, an alpha matte includes foreground, background, and alpha values for combining two or more images. For example, an alpha matte includes a map of pixel-values in grayscale between black and white (or represented numerically, such as between zero and one). To illustrate, an alpha matte contains pixel-wise information about how much of an input image to retain in an output image (e.g., for generating a modified digital image). In some cases, the combination values in an alpha matte (e.g., alpha values between zero and one) represent translucent portions of a foreground subject, motion blur, and/or fine details around the foreground subject (e.g., a person's hair).

A polarized digital image includes a digital image captured through a polarized filter of a camera. Thus, a polarized digital image comprises an image depicting polarized light at an angle matching a polarization angle of the polarized filter. In addition, a digital image includes one or more images depicting a scene. In some embodiments, a digital image includes a plurality of polarized digital images, wherein each of the plurality of polarized digital images depicts the same scene from the same vantage point. For example, while each of the plurality of polarized digital images comprise different light orientations based on their polarization angles, they portray the same scene and together make up the digital image. Thus, the description herein of a digital image is applicable to a plurality of polarized digital images.

Moreover, in some embodiments, the matte preparation system 102 operates on digital videos. For example, the matte preparation system 102 obtains a plurality of polarized digital videos depicting an animation of a foreground subject(s) in a scene. In some implementations, the matte preparation system 102 performs the techniques described herein on the digital video (e.g., the plurality of polarized digital videos), frame by frame. Thus, a digital image includes a frame of a digital video, and a polarized digital image includes a frame of a polarized digital video. In some embodiments, a foreground subject includes a person or a group of people. In some embodiments, a foreground subject includes an animate or inanimate object.

In some implementations, a polarized light source includes a light source that emits or reflects polarized light at a particular phase angle of polarization (i.e., polarization angle). For example, a polarized light source can include a device that emits light at a zero-degree polarization angle (or any other angle). To illustrate, a polarized light source includes a television or a computer monitor that emits polarized light. As another example, a polarized light source includes a custom polarized light source having a polarized filter (e.g., at a particular polarization angle, such as zero degrees) and even lighting positioned behind the polarized filter. In some implementations, the polarized light source is positioned behind the foreground subject to provide polarized backlighting for capturing polarized digital images and/or videos. In some implementations, the polarized light source is a polarized filter mounted on a diffuse material that reflects ambient light for illumination.

A phase angle of polarization (or polarization angle) includes an angle at which polarized light is emitted, reflected, or captured. For example, the polarization angle of a polarized light source is the angle at which the polarized light source emits light. Similarly, the polarization angle of a polarized filter is the angle of light at which the polarized filter permits light to pass through.

However, as mentioned previously, some conventional systems do not adequately account for reflected polarized light on foreground objects. These ill-posed pixels can introduce inaccuracies in alpha mattes and artifacts in digital images that rely on the alpha matte for modifications (e.g., for replacing foreground or background pixels). Thus, well-posed pixels include those pixels that do not portray/include conflating reflected polarized light.

As shown in FIG. 2, in some implementations, the matte preparation system 102 utilizes an alpha matting model 206 to generate the alpha matte 208. As described in further detail below, in some embodiments, the alpha matting model 206 accounts for ill-posed pixels by utilizing a polarized pixel filtering model (e.g., the polarized pixel filtering model 114) and a phase angle filtering model (e.g., the phase angle filtering model 116). For example, the matte preparation system 102 utilizes the polarized pixel filtering model 114 to determine a first group of well-posed pixels 214 of the plurality of polarized digital images 202. Additionally, in some implementations, the matte preparation system 102 utilizes the phase angle filtering model 116 to determine a second group of well-posed pixels 216 of the plurality of polarized digital images 202.

To further illustrate, in some implementations, the matte preparation system 102 utilizes the polarized pixel filtering model 114 to determine degrees of polarization of the pixels of the digital image. The polarized pixel filtering model 114 can analyze polarized light intensity of the polarized digital image (relative to the polarized background digital images) to identify foreground pixels that include polarized light. As described in greater detail below, the polarized pixel filtering model 114 can utilize a least squares solution that compares foreground and background polarized light intensity (e.g., by comparing a combined alpha value-polarized light intensity metric to a threshold). The polarized pixel filtering model 114 can also utilize a Bayesian framework that accounts for imaging noise in polarized background digital images.

Moreover, in some implementations the matte preparation system 102 utilizes the phase angle filtering model to determine polarization angles of the pixels. The phase angle filtering model 116 can compare phase angles of an observed polarized digital image and a pre-captured polarized background digital image. Where those phase angles differ beyond a threshold, the phase angle filtering model can identify well-posed pixels that are unlikely to undermine the accuracy of the resulting alpha matte.

Furthermore, as described in additional detail below, in some embodiments, the matte preparation system 102 utilizes the alpha matting model 206 to generate the alpha matte from alpha matte values for the well-posed pixels. For example, the matte preparation system 102 processes alpha matte value estimates for the well-posed pixels through a polarimetric matting Laplacian model (e.g., the polarimetric matting Laplacian model 118) to generate the alpha matte 208. The polarimetric mating Laplacian model can preserve the alpha values of well-posed pixels while utilizing polarized light intensities and the well-posed pixels to determine alpha values for the remainder of the pixels. Additional detail regarding the polarimetric matting Laplacian model is provided below (e.g., in relation to FIG. 5).

As just mentioned, in some embodiments, the matte preparation system 102 determines well-posed pixels of a plurality of polarized digital images by identifying degrees of polarization and/or angles of polarization of the several pixels in the plurality of polarized digital images. For instance, FIG. 3 illustrates the matte preparation system 102 determining degrees and angles of polarization for a scene including a foreground subject in accordance with one or more embodiments.

Figure 3:
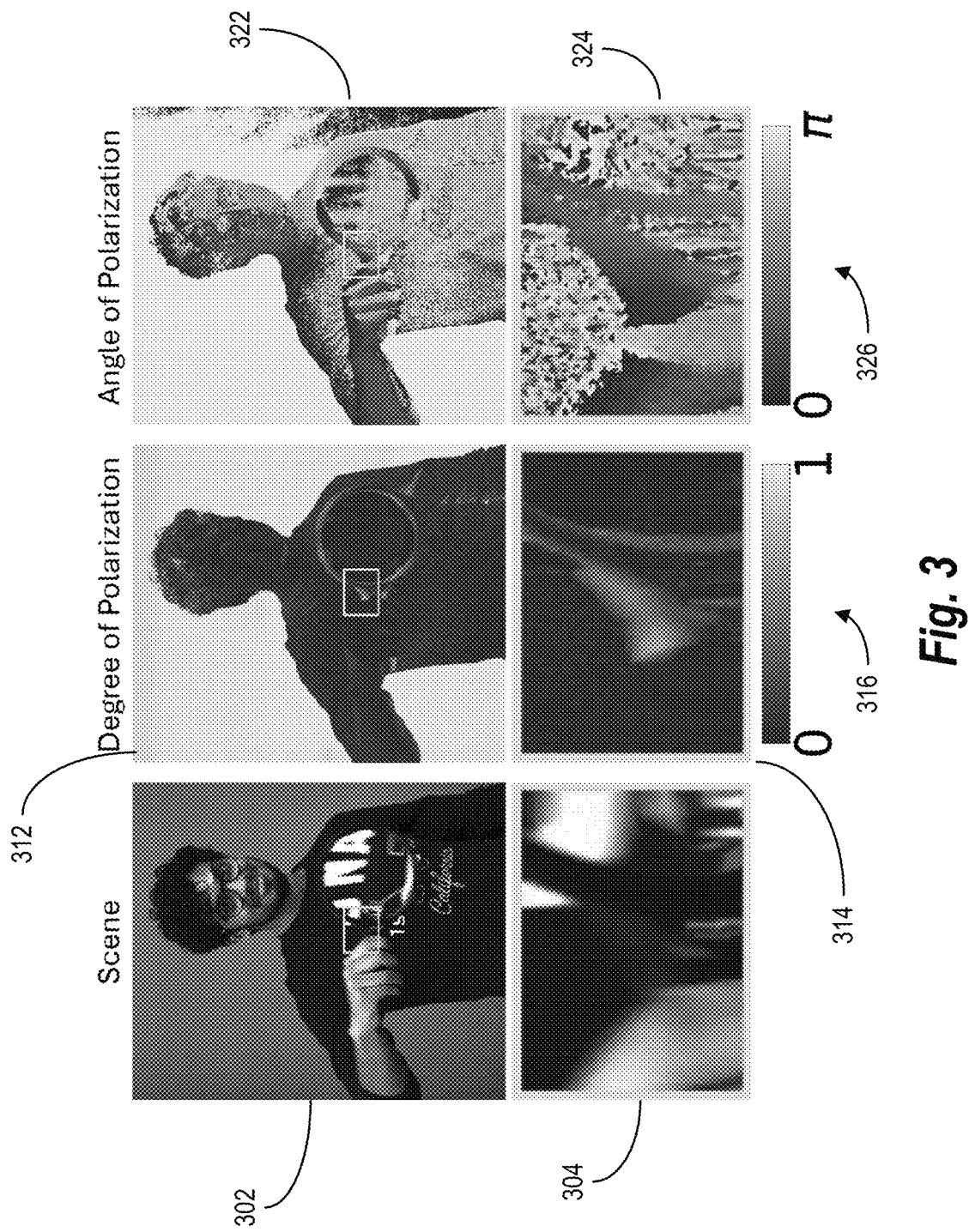
FIG. 3 illustrates the matte preparation system determining degrees and angles of polarization for a scene including a foreground subject in accordance with one or more embodiments.

Specifically, FIG. 3 shows a digital image 302 portraying a scene of a foreground subject in front of a polarized light source. Additionally, FIG. 3 shows a close-up view 304 of a portion of the foreground subject from the digital image 302. Moreover, FIG. 3 shows a degree of polarization map 312 indicating the degree of polarization of each pixel of the scene portrayed in the digital image 302. In addition, a close-up view 314 of the portion of the foreground subject shows degrees of polarization from the degree of polarization map 312. A degree of polarization key 316 for the degree of polarization map 312 is shown below the close-up view 314. As indicated by the degree of polarization key 316, the degrees of polarization range from zero (unpolarized light captured in the digital image 302) to one (fully polarized light captured in the digital image 302).

As noted above, in some embodiments, the matte preparation system 102 determines degrees of polarization based on multiple polarized digital images (e.g., two polarized digital images, three polarized digital images, four polarized digital images, or more polarized digital images). For example, in the case of two polarized digital images, the matte preparation system 102 obtains (e.g., captures, receives from another system, etc.) a first digital image captured utilizing a first polarization filter set to capture light at a first polarization angle and a second digital image captured utilizing a second polarization filter set to capture light at a second polarization angle different from the first polarization angle (e.g., orthogonal to the first polarization angle). As mentioned, in some embodiments, the matte preparation system 102 determines degrees of polarization based on three polarized digital images. Moreover, in some embodiments, the matte preparation system 102 determines degrees of polarization based on four or more polarized digital images.

In some embodiments, the matte preparation system 102 determines degrees of polarization of light captured at a particular pixel in the scene based on intensities of the corresponding pixels in the respective polarized digital images. For example, the matte preparation system 102 utilizes the respective light intensities of a pixel of the first polarized digital image and of a corresponding pixel (i.e., in the same relative location in the scene) of the second polarized digital image to determine a degree of polarization for those corresponding pixels. For instance, if the intensity of the pixel of the first polarized image is different from the intensity of the corresponding pixel of the second polarized image, the light captured in those pixels is polarized (either partially polarized or fully polarized).

In some embodiments, corresponding pixels across a plurality of polarized digital images (e.g., for a plurality of polarized digital videos, corresponding video frames having the same time stamp) are pixels in the polarized digital images at the same location (or nearly the same location, such as within a 2 pixel radius). For example, the upper-left-most pixels of corresponding frames of polarized digital videos are corresponding pixels. In some embodiments, a camera with multiple polarization filters captures and stores light through photosensor pixels arranged in a grid (e.g., a two-by-two grid), with one or more pixels in the grid covered by one filter, and one or more other pixels in the grid covered by another filter, etc. In such embodiments, the pixels in the grid are corresponding pixels. Moreover, in some implementations, a camera captures and stores light in a grid of corresponding photosensor pixels having both color and polarization properties. For example, a digital camera with a color and polarization filter comprising three unique color channels (e.g., RGB) and four unique polarization channels (e.g., 0, 45, 90, and 135 degrees) comprises twelve unique channels for each of the combinations of the unique colors and the unique polarization angles.

FIG. 3 also shows an angle of polarization map 322 indicating the angle of polarization of each pixel of the scene portrayed in the digital image 302. In addition, a close-up view 324 of the portion of the foreground subject shows angles of polarization from the angle of polarization map 322. An angle of polarization key 326 for the angle of polarization map 322 is shown below the close-up view 324. As indicated by the angle of polarization key 326, the angles of polarization range from zero to pi radians (or 180 degrees).

Similar to determining the degree of polarization as discussed above, in some embodiments, the matte preparation system 102 determines angles of polarization based on multiple polarized digital images. For instance, the matte preparation system 102 utilizes the respective light intensities of a pixel of the first polarized digital image and of a corresponding pixel of the second polarized digital image to determine an angle of polarization for those corresponding pixels. For example, if the intensity of the pixel of the first image is relatively low and the intensity of the corresponding pixel of the second image is relatively high, the light captured in those pixels has an angle of polarization relatively close to (or equal to) the angle of polarization of the second polarization filter. Moreover, in some embodiments, the matte preparation system 102 determines angles of polarization based on three polarized digital images. Furthermore, in some embodiments, the matte preparation system 102 determines angles of polarization based on four or more polarized digital images.

As mentioned, in some implementations, the matte preparation system 102 determines well-posed pixels in the plurality of polarized digital images. Well-posed pixels include a pixel that shows reflected light from the foreground if the reflected light is unpolarized. Additionally, well-posed pixels include a pixel that shows reflected light from the foreground if the reflected light is polarized but at a phase angle that differs sufficiently (e.g., more than a predetermined threshold) from the phase angle of the background polarized light source. Moreover, in some implementations, well-posed pixels include a background pixel (e.g., a pixel that shows light from the background polarized light source but not any polarized foreground light).

By contrast, in some implementations, pixels that show reflected light from the foreground that is polarized and of a close phase angle to the background polarization phase angle are not well-posed pixels. Foreground pixels can show polarized or partially polarized light when, for example, foreground light is reflected off of certain surfaces of the foreground subject. For example, if the foreground subject includes dielectric materials or has surfaces with a shiny quality, unpolarized ambient light may reflect off of the foreground subject partially polarized. The reflections of partially polarized light off of the foreground subject can cause the foreground pixels to be ill-posed, such that it is not readily ascertainable whether these pixels actually belong to the foreground. However, as described in greater detail below, the matte preparation system 102 identifies that some of the pixels are not well-posed and utilizes alpha values for the well-posed pixels to propagate the alpha matte to the regions of the digital image having the ill-posed pixels, thereby nonetheless generating a high-quality alpha matte across the entire digital image.

As discussed above, in some embodiments, the matte preparation system 102 determines well-posed pixels of a plurality of polarized digital images. For instance, FIGS. 4A and 4B illustrate the matte preparation system 102 utilizing a polarized pixel filtering model and a phase angle filtering model to determine well-posed pixels of a plurality of polarized digital images in accordance with one or more embodiments.

Figure 4A:
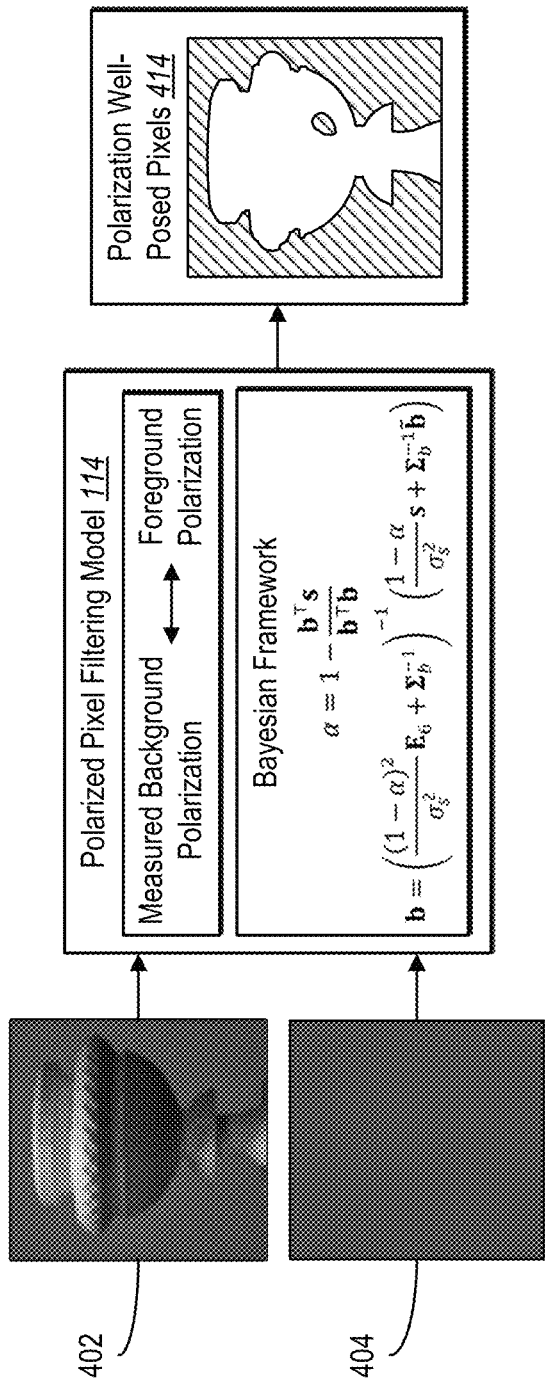
FIGS. 4A and 4B illustrate the matte preparation system utilizing a polarized pixel filtering model and a phase angle filtering model to determine well-posed pixels of a plurality of polarized digital images in accordance with one or more embodiments.
Figure 4B:
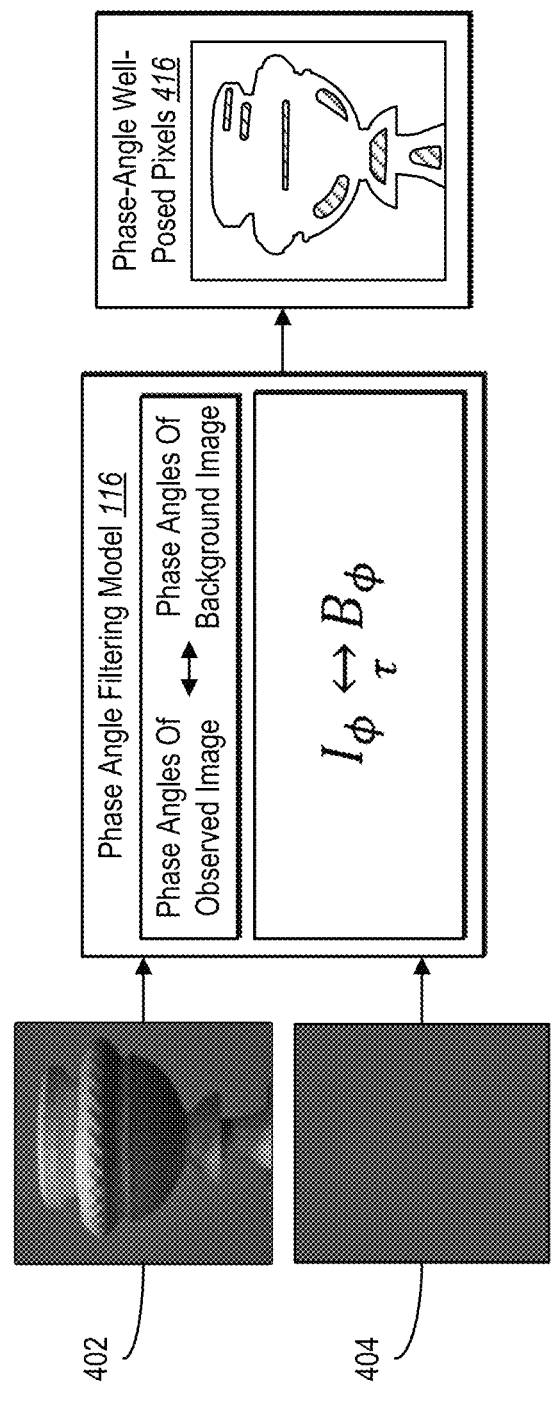

Specifically, FIG. 4A shows the matte preparation system 102 obtaining a digital image 402 (e.g., including a plurality of polarized digital images depicting a scene) and obtaining a background digital image 404 (e.g., including a plurality of polarized background digital images depicting a background polarized light source). Additionally, FIG. 4A shows the matte preparation system 102 processing the digital image 402 and the background digital image 404 through the polarized pixel filtering model 114 to determine a first group of well-posed pixels (e.g., polarization well-posed pixels 414).

While FIG. 4A shows the matte preparation system 102 obtaining the digital image 402 and the background digital image 404, in some embodiments, the matte preparation system 102 obtains a set of four polarized digital images and a set of four polarized background digital images (or multiple sets of four polarized images). For instance, the matte preparation system 102 captures a first polarized digital image at a first phase angle of polarization (e.g., zero degrees), a second polarized digital image at a second phase angle of polarization (e.g., forty five degrees), a third polarized digital image at a third phase angle of polarization (e.g., ninety degrees), and a fourth polarized digital image at a fourth phase angle of polarization (e.g., one hundred and thirty five degrees). While the description below generally refers to four polarized digital images in the plurality of polarized digital images, other quantities of polarized digital images (e.g., for a single perspective view of a single scene at a single point in time) are possible.

As mentioned, in some embodiments, the matte preparation system 102 utilizes the polarized pixel filtering model 114 to select pixels of the digital image 402 that are devoid of polarized foreground light. For example, the matte preparation system 102 determines a polarized foreground intensity of a pixel (e.g., a group of corresponding pixels in a plurality of polarized digital images at the same location in the scene) based on image intensities of the plurality of polarized digital images and background intensities of the plurality of background images. For instance, the matte preparation system 102 compares the polarized foreground intensity and an alpha matte value estimate with a threshold value. To illustrate, if the foreground intensity combined with the alpha matte value estimate is less than the threshold value, the matte preparation system 102 categorizes that pixel as a well-posed pixel.

As mentioned above, the matte preparation system 102 can utilize a variety of approaches to compare foreground polarized light intensity and background polarized intensity to identify those foreground pixels that do not portray reflected polarized light. For example, in some embodiments, the matte preparation system 102 utilizes a least squares approach. In this approach, the matte preparation system 102 estimates alpha values and compares background polarized light intensities to foreground polarized light intensities to determine a measure of reflected polarized light. Specifically, the measure of reflected polarized light can comprise a combination of an estimated alpha value with a foreground polarized light intensity. If this measure of reflected polarized light is greater than a threshold (e.g., zero or another value), the matte preparation system 102 can exclude those pixels from the first set of well-posed pixels.

In some implementations, the matte preparation system 102 also accounts for noise in background polarized digital images. Indeed, if polarized light intensities from the background polarized digital images include some noise, then comparing the background polarized light intensity with the foreground polarized light intensity can lead to errors in identified well-posed pixel estimates. In one or more embodiments, the matte preparation system 102 accounts for this noise by utilizing a Bayesian framework. In this approach, the matte preparation system 102 pre-captures background polarized digital images and determines variation metrics of the background light intensities (e.g., mean and variance or other statistical variation measures). The matte preparation system 102 then iteratively determines alpha and the background light intensities (utilizing the variation metrics) until they converge. Upon convergence, the system determines a measure of reflected polarized light (e.g., a combined estimate of alpha values with the foreground polarized light intensity). The matte preparation system 102 utilizes this measure of reflected polarized light to determine well-posed pixels (e.g., by comparing the measure of reflected polarized light to a pre-determined threshold).

For example, the pixel-wise image intensity $I\phi$ of a polarized digital image is a composite of a foreground intensity and a background intensity:

$$I_\phi = \alpha F_\phi + (1-\alpha)B_\phi$$

where $\alpha \in [0,1]$ is an alpha matte value for the pixel, $F_\phi \in \mathbb{R}_+^3$ is the foreground intensity, and $B\phi \in \mathbb{R}_+^3$ is the background intensity. The angle $\phi$ is the angle of the polarizing filter in front of the camera. The foreground and background intensities are further decomposed into unpolarized and polarized foreground intensities F, $P \in \mathbb{R}_+^3$, and unpolarized and polarized background intensities B, $Q \in \mathbb{R}_+^3$, respectively:

$$I_\phi = \alpha\left(F + P \odot \cos^2(\theta_f - \phi 1)\right) + (1-\alpha)\left(B + Q \odot \cos^2(\theta_b - \phi 1)\right)$$

where $\theta_f$, $\theta_b \in \mathbb{R}^3$ are the phase angles of the light from the foreground and background, respectively. The operation $\odot$ denotes element-wise multiplication. This equation is the polarimetric compositing equation.

As mentioned, in some implementations, the matte preparation system 102 utilizes a modern polarization camera with a color polarization filter array that captures four polarization images $I\phi$, $$\phi \in \left\{0, \frac{\pi}{4}, \frac{\pi}{2}, \frac{3\pi}{4}\right\}$$

in a single shot. Alternatively, another system captures the four polarization images, and the matte preparation system 102 receives them from that other system. In some embodiments, the matte preparation system 102 determines Stokes parameters for the four polarization images, described in the form of compositing equations:

$$s_1 = I_0 - I_{\frac{\pi}{2}} = \alpha P \odot \cos 2\theta_f + (1-\alpha)Q \odot \cos 2\theta_b$$

$$s_2 = I_{\frac{\pi}{4}} - I_{\frac{3\pi}{4}} = \alpha P \odot \sin 2\theta_f + (1-\alpha)Q \odot \sin 2\theta_b$$

Moreover, for simplicity of notation, portions of the terms of the Stokes parameters are represented as foreground and background parameters: $f_1 = P \odot \cos 2\theta_f$, $b_1 = Q \odot \cos 2\theta_b$, $f_2 = P \odot \sin 2\theta_f$, and $b_2 = Q \odot \sin 2\theta_b$. In some embodiments, the matte preparation system 102 solves an optimization problem for the alpha matte by determining alpha matte values $a$ and polarized foreground intensities P based on the Stokes parameters $s_i$ and the background parameters $b_i$ for $i \in \{1, 2\}$.

As mentioned, in some implementations, the plurality of polarized digital images includes ill-posed pixels, thus presenting a polarimetric matting problem that is ill posed. However, the matte preparation system 102 utilizes a robust technique to determine well-posed pixels, extract high-confidence alpha matte values for the well-posed pixels, and propagate the alpha matte to the ill-posed pixels. For clarity of notation, the Stokes parameters, foreground parameters, and background parameters are concatenated into larger vectors as follows:

$$s = \left[s_1^T, s_2^T\right]^T, \quad f = \left[f_1^T, f_2^T\right]^T,$$

and $$b = [b_1^T, b_2^T]^T.$$

In some implementations, the matte preparation system 102 solves a minimization problem of polarized foreground intensity $$\|\alpha P\|_2^2.$$

Since $$\|\alpha P\|_2^2 = \|\alpha f\|_2^2,$$

the minimization problem of $$\|\alpha P\|_2^2$$

can be denoted as:

$$\min_\alpha \|\alpha P\|_2^2 = \min_\alpha \|s - (1 - \alpha)b\|_2^2$$

This is a least squares objective with a closed-form solution for α as follows:

$$\hat\alpha = 1 - \frac{b^T s}{b^T b}$$

The value of $\|\hat\alpha\hat P\|_2 = \|s - (1-\hat\alpha)b\|_2$ is zero if the problem is well-posed. Thus, the matte preparation system 102 evaluates the uncertainty of the estimated alpha matte by $\|\hat\alpha\hat P\|_2$ and determines the first group of well-posed pixels as pixels that satisfy $\|\hat\alpha\hat P\|_2 < \tau_0$, where $\tau_0$ is a predetermined threshold value.

While this thresholding theoretically finds all well-posed pixels, in practice, the value of $\|\hat\alpha\hat P\|_2$ can be non-zero even at background pixels due to imaging noise. Moreover, a large threshold value can degrade reliability of the well-posed pixel detection. Thus, in some implementations, the matte preparation system 102 utilizes a Bayesian framework to increase the robustness of well-posed pixel detection.

To illustrate the Bayesian framework, in some implementations, the matte preparation system 102 utilizes a maximum a posteriori estimator. While in some cases a background b is pre-captured, the background intensity of s can deviate slightly from the pre-captured b in practice. Thus, in some cases, the matte preparation system 102 solves the polarimetric matting problem as a maximization problem of a probability distribution P(a, b|s) described as:

$$\underset{a,b}{\mathrm{argmax}} P(\alpha, b \mid s) = \underset{a,b}{\mathrm{argmax}} \frac{P(s \mid \alpha, b)P(\alpha)P(b)}{P(s)} = \underset{a,b}{\mathrm{argmax}} L(s \mid \alpha, b) + L(b)$$

where $L(\cdot) = \log P(\cdot)$ is the log likelihood. In some cases, the matte preparation system 102 makes no assumption of the prior for s and a, and thus P(s) and P(a) are constant.

The log likelihood L(s|a, b) measures the fitness of the estimates {a, b} to an observed polarization intensity s by $$L(s \mid \alpha, b) = -\frac{1}{2\sigma_s^2} \|s - (1 - \alpha)b\|_2^2$$

where $\sigma_s$ is a noise variance of s. In some embodiments, the matte preparation system 102 models P(b) with a multivariate Gaussian distribution centered at the pre-captured background, hence, the log likelihood is $$L(b) = -\frac{1}{2}(b - \bar b)^T \sum\nolimits_b^{-1} (b - \bar b)$$

where $\bar b \in \mathbb{R}^6$ and $\Sigma_b \in \mathbb{R}^{6 \times 6}$ are the mean vector and covariance matrix.

In some implementations, the matte preparation system 102 pre-captures background images several times (e.g., three times, five times, twenty times, or any other number of times) and computes the element-wise mean, variance, and covariance of b for $\bar b$ and the elements of $\Sigma_b$, respectively. Moreover, in some embodiments, the matte preparation system 102 determines the polarized foreground intensity by determining the alpha matte value estimate based on the image intensities of the plurality of polarized digital images and average background intensities for a set of multiple pluralities of background images (e.g., the plurality of background images captured several times).

In some implementations, the matte preparation system 102 determines alpha matte values for well-posed pixels by combining, for corresponding pixels of the plurality of polarized digital images, image intensities of the plurality of polarized digital images with background intensities of the plurality of polarized digital images. For example, the matte preparation system 102 solves the maximization problem of the probability distribution P(a, b|s), resulting in solutions for a and b:

$$\alpha = 1 - \frac{b^T s}{b^T b}$$

$$b = \left(\frac{(1 - \alpha)^2}{\sigma_s^2} E_6 + \sum\nolimits_b^{-1}\right)^{-1} \left(\frac{1 - \alpha}{\sigma_s^2} s + \sum\nolimits_b^{-1} \bar b\right)$$

where $E_6$ is the 6×6 identity matrix. In some embodiments, the matte preparation system 102 iteratively computes a and b utilizing these two equations to estimate an alpha matte value $\hat\alpha$. For each pixel, from the alpha matte value estimate, the background parameter vector, and the Stokes parameter vector (which is determined from the pixel-wise light intensities of the plurality of polarized digital images, as described above), the matte preparation system 102 determines the polarized foreground intensity P, and compares the polarized foreground intensity and the alpha matte value estimate with the threshold value as described above. For pixels that satisfy $\|\hat\alpha\hat P\|_2 < \tau_0$, the matte preparation system 102 categorizes these pixels as well-posed pixels.

The thresholding of minimized polarized foreground intensity finds well-posed pixels with approximately unpolarized foreground reflection, and the remaining pixels likely contain polarized foreground reflection. As mentioned, in some embodiments, the matte preparation system 102 utilizes the phase angle filtering model 116 to determine additional well-posed pixels from these remaining pixels. The additional well-posed pixels, while depicting polarized foreground light, are nevertheless well-posed because their phase angle of polarization is sufficiently different from the background phase angle of polarization.

As also mentioned, in some embodiments, the matte preparation system 102 utilizes a phase angle filtering model to select polarized pixels of the digital image 402 that have phase angles of polarization distinct from a background phase angle of polarization in the background digital image 404. For example, FIG. 4B shows the matte preparation system 102 processing the digital image 402 and the background digital image 404 through the phase angle filtering model 116 to determine a second group of well-posed pixels (e.g., phase-angle well-posed pixels 416).

For example, the matte preparation system 102 compares a phase angle of polarization of a pixel (e.g., a group of corresponding pixels in the plurality of polarized digital images at the same location in the scene) with a background phase angle of polarization of corresponding pixels of the plurality of background images (e.g., the pixels of the background images that are also at the location of the corresponding pixels of the plurality of polarized digital images). To illustrate, if the phase angle of polarization of the pixel is sufficiently different from the background phase angle of polarization (e.g., by more than a threshold amount), the matte preparation system 102 categorizes that pixel as a well-posed pixel. Moreover, in some implementations, the matte preparation system 102 assigns a value of one to the alpha matte value estimate for that pixel (e.g., because the matte preparation system 102 has reasonable certainty that the pixel is a foreground pixel, because it depicts polarized light that is different from the background polarized light).

In some embodiments, the matte preparation system 102 utilizes an additional thresholding comparison based on phase angle deviation to determine the additional well-posed pixels. For instance, when the phase angles of a pixel of an observed image $I_\phi$ and of the corresponding pixel of a pre-captured background image $B_\phi$ differ significantly, the pixel is likely to be a foreground pixel. Thus, the matte preparation system 102 selects the additional well-posed pixels (in this case, polarized pixels) comprising phase angles of polarization distinct from the background phase angle of polarization by comparing a phase angle difference with a threshold value.

To illustrate, in some implementations, the matte preparation system 102 utilizes the following thresholding inequality to determine the additional well-posed pixels:

$$\frac{1}{2}\cos^{-1}\frac{s^T b}{\|s\|_2 \|b\|_2} > \tau_1$$

where $\tau_1$ is a predetermined threshold. Pixels that satisfy this thresholding are likely to be foreground pixels, and thus the matte preparation system 102 assigns unity values to alpha matte value estimates for these pixels: $\hat{\alpha}=1$.

As mentioned above, in some embodiments, the matte preparation system 102 generates an alpha matte for a digital image. For instance, FIG. 5 illustrates the matte preparation system 102 utilizing a polarimetric matting Laplacian model to propagate alpha matte values and generate an alpha matte for a digital image using well-posed pixel information in accordance with one or more embodiments.

Figure 5:
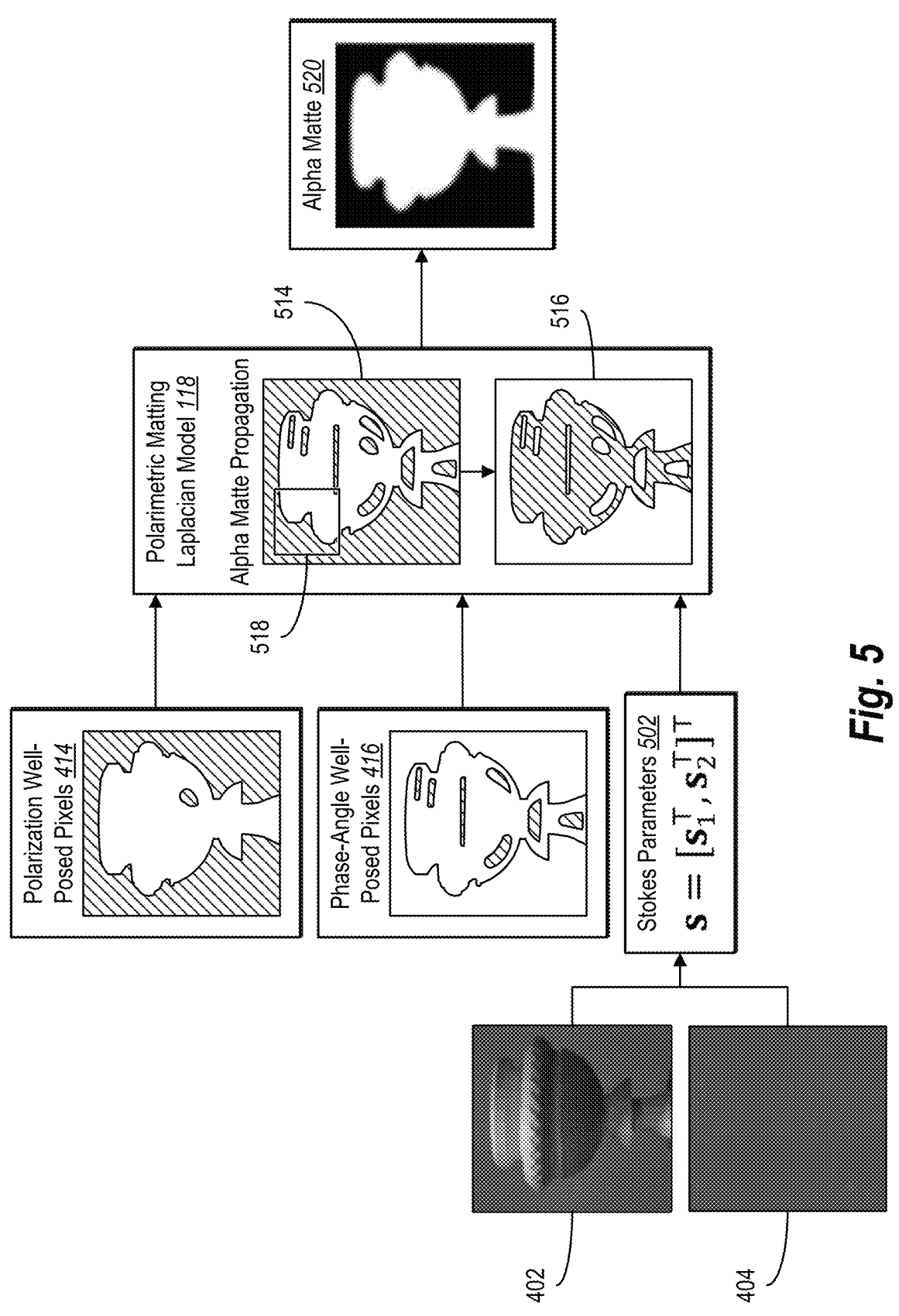
FIG. 5 illustrates the matte preparation system utilizing a polarimetric matting Laplacian model to propagate alpha matte values and generate an alpha matte for a digital image in accordance with one or more embodiments.

Specifically, FIG. 5 shows the matte preparation system 102 processing alpha matte value estimates for well-posed pixels 514 (e.g., the polarization well-posed pixels 414 and the phase-angle well-posed pixels 416) through the polarimetric matting Laplacian model 118 to generate an alpha matte 520 for the digital image 402 and the background digital image 404. In particular, in some embodiments, the matte preparation system 102 generates the alpha matte 520 for the digital image 402 by propagating the alpha matte from the well-posed pixels 514 to additional pixels 516 (e.g., ill-posed pixels). As described above, the matte preparation system 102 determines alpha matte value estimates for the well-posed pixels 514. In some implementations, the matte preparation system 102 uses these alpha matte value estimates as a baseline for the alpha matte, and determines additional alpha matte values (e.g., for the ill-posed pixels) by extending the alpha matte to the additional pixels 516 by solving an optimization problem.

More particularly, in some embodiments, the matte preparation system 102 propagates the alpha matte from the well-posed pixels 514 to the additional pixels 516 by determining a polarimetric matting Laplacian for the plurality of polarized digital images. For instance, the matte preparation system 102 determines the polarimetric matting Laplacian based on image intensities for corresponding pixels of the plurality of polarized digital images and average image intensities over a local window 518 comprising the corresponding pixels. A polarimetric matting Laplacian includes a matting Laplacian matrix determined from the vector s of Stokes parameters 502 described above. In some embodiments, the matte preparation system 102 utilizes the polarimetric matting Laplacian to solve a quadratic cost function of the alpha matte values. Thus, the matte preparation system 102 determines the additional alpha matte values for the additional pixels 516 based on the alpha matte values for the well-posed pixels 514 and the polarimetric matting Laplacian.

To illustrate symbolically, in some embodiments, the matte preparation system 102 solves the cost function $$J(\alpha) = \alpha^T L_p \alpha$$

where $\alpha \in \mathbb{R}^N$ is a vector of alpha matte values for all N pixels of the digital image and $L_p \in \mathbb{R}^{N \times N}$ is the polarimetric matting Laplacian. The (i,j)-th element of the polarimetric matting Laplacian is:

$$\sum_{k:(i,j)\in \mathcal{W}_k} \left( \delta_{ij} - \frac{1}{|\mathcal{W}_k|} \left( 1 + (s_i - \mu_k)^T \left( \sum_k + \frac{\epsilon}{|\mathcal{W}_k|} E_6 \right)^{-1} (s_j - \mu_k) \right) \right)$$

where $s_i$ is the vector of Stokes parameters s of the i-th pixel in a local window $\mathcal{W}_k$, and $\mu_k \in \mathbb{R}^6$ and $\Sigma_k \in \mathbb{R}^{6 \times 6}$ are the mean vector and covariance matrix of s in the local window, respectively. Additionally, $\delta_{ij}$ is the Kronecker delta and E is a small positive constant. In some embodiments, the matte preparation system 102 utilizes an assumption that the foreground and background Stokes parameters, f and b, of a local window lie in a low-dimensional space. Thus, in some embodiments, the matte preparation system 102 determines the polarimetric matting Laplacian for the plurality of polarized digital images based on image intensities for corresponding pixels of the plurality of polarized digital images and average image intensities over a local window comprising the corresponding pixels.

In some implementations, the matte preparation system 102 solves an expanded cost function that includes the quadratic cost function of the alpha matte values and the polarimetric matting Laplacian together with additional constraints. For example, the matte preparation system 102 includes constraints for the well-posed alpha matte value estimates, and weak supervision of the least squares objective given above. Thus, in some implementations, the matte preparation system 102 solves an optimization problem for the alpha matte values as:

$$\alpha = \operatorname*{argmin}_{\alpha} \alpha^T L_p \alpha + \lambda(\alpha - \hat{\alpha})^T D(\alpha - \hat{\alpha}) + \alpha^T W V \alpha + 2v^T W \alpha$$

where the first term is the cost function with the polarimetric matting Laplacian, the second term constrains the solution to match the well-posed alpha matte value estimates described above, and the third and fourth terms weakly supervise the solution by the least squares objective in case there are no clues from the first and second terms. Additionally, $\lambda$ is a large positive number, $\hat{\alpha}$ is a $\mathbb{R}$ vector of well-posed alpha value estimates, and $D \in \mathbb{R}^{N \times N}$ is a diagonal matrix whose diagonal elements are one for well-posed pixels and zero for other pixels. Moreover, $W \in \mathbb{R}^{N \times N}$ is a $\mathbb{R}$ diagonal weighting matrix whose diagonal elements are $\exp(-\kappa \|\hat{\alpha}\hat{P}\|_2)$ per pixel and K is a large number. Additionally, V is a diagonal matrix whose diagonal elements are $b^T b$, and v is the vector of $b^T$ $(s-b)$ for each pixel.

This expanded cost function has a solution obtained by solving the linear system:

$$(L_p + \lambda D + W V)\alpha = \lambda D \hat{\alpha} - W v$$

Thus, in some implementations, the matte preparation system 102 determines the alpha matte values for all pixels of the digital image by solving this linear system for the vector of alpha matte values a.

As mentioned above, in some embodiments, the matte preparation system 102 generates alpha mattes and modified digital images. For instance, FIG. 6 illustrates the matte preparation system 102 generating an alpha matte from a plurality of polarized digital images and generating a modified digital image utilizing the alpha matte in accordance with one or more embodiments.

Figure 6:
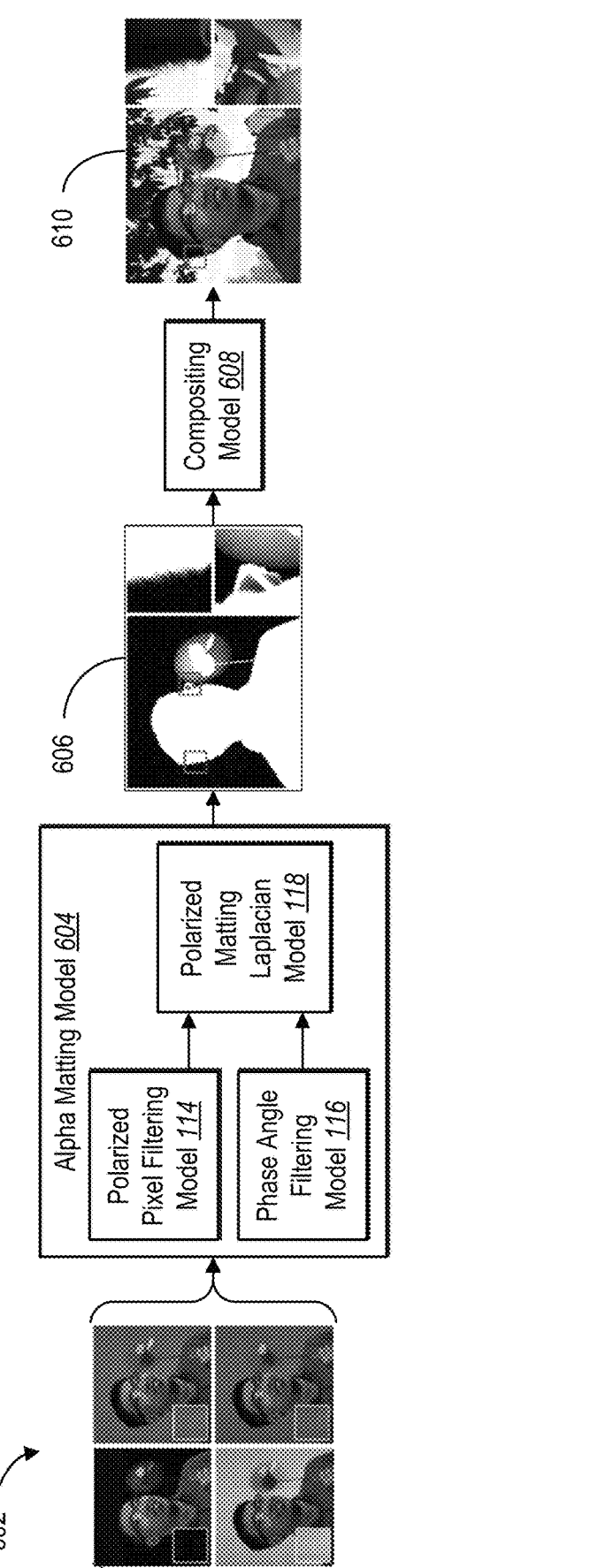
FIG. 6 illustrates the matte preparation system generating an alpha matte from a plurality of polarized digital images and generating a modified digital image utilizing the alpha matte in accordance with one or more embodiments.

Specifically, FIG. 6 shows the matte preparation system 102 obtaining a plurality of polarized digital images 602 and processing the plurality of polarized digital images 602 through an alpha matting model 604 (e.g., the alpha matting model 206) to generate an alpha matte 606. As mentioned above, in some implementations, the matte preparation system 102 generates the alpha matte 606 for the plurality of polarized digital images 602 from alpha matte values for the well-posed pixels. For instance, the matte preparation system 102 utilizes the polarized pixel filtering model 114 and the phase angle filtering model 116 to determine well-posed pixels and to determine alpha matte value estimates for the well-posed pixels. Furthermore, the matte preparation system 102 processes the alpha matte value estimates for the well-posed pixels through the polarimetric matting Laplacian model 118 to determine alpha matte values for additional pixels. Thus, in some embodiments, the matte preparation system 102 generates the alpha matte 606 from the alpha matte values determined for each pixel of the plurality of polarized digital images 602.

As mentioned, in some embodiments, the matte preparation system 102 generates a modified digital image from the plurality of polarized digital images and the alpha matte. For example, FIG. 6 shows the matte preparation system 102 processing the alpha matte 606 and the plurality of polarized digital images 602 through a compositing model 608 to generate a modified digital image 610. A modified digital image includes a digital image of a foreground subject with at least a portion of the original digital image replaced with pixels of a replacement background. For example, a modified digital image is an image of the foreground subject superimposed over a replacement background.

To illustrate, in some implementations, the matte preparation system 102 generates the modified digital image 610 by combining foreground pixels of the plurality of polarized digital images 602 portraying the foreground subject and a replacement background utilizing the alpha matte 606. For instance, the matte preparation system 102 preserves pixels of the plurality of polarized digital images 602 that correspond with alpha matte pixels with value of one, while removing pixels of the plurality of polarized digital images 602 that correspond with alpha matte pixels with value of zero.

Additionally, the matte preparation system 102 scales or weights pixels of the plurality of polarized digital images 602 with corresponding alpha matte values between zero and one, and combines those weighted values with the replacement background pixels according to the alpha matte values. For instance, if the alpha matte value at a particular pixel is 0.7, the matte preparation system 102 applies the alpha matte value to the foreground color (e.g., by multiplying by 0.7) and applies the alpha matte value to the background color (e.g., by multiplying by 0.3) and combines the resulting values together to generate the corresponding pixel of the modified digital image.

Specifically, the matte preparation system 102 extracts foreground color as follows:

$$\alpha F_\phi = I_\phi - (1 - \alpha)B_\phi$$

In addition, the matte preparation system 102 composites the foreground color onto a new background as follows:

$$I_{new} = \alpha F_\phi + (1 - \alpha)B_{new}$$

In some embodiments, the matte preparation system 102 utilizes just one polarized digital image of the plurality of polarized digital images 602 as the input digital image to the compositing model 608. For instance, the matte preparation system 102 utilizes the polarized digital image captured utilizing the polarization filter orthogonal to the background polarized light source. Alternatively, in some embodiments, the matte preparation system 102 utilizes a weighted combination of some or all of the plurality of polarized digital images 602. For example, the matte preparation system 102 utilizes all of the plurality of polarized digital images 602 weighted equally as the input digital image to the compositing model 608.

In addition, in some implementations, the matte preparation system 102 prepares a training dataset for one or more machine learning models. In particular, the matte preparation system 102 adds the modified digital image 610 to the training dataset, as well as the alpha matte 606 as a ground truth for the modified digital image. In some embodiments, the matte preparation system 102 prepares a modified digital video from a plurality of polarized digital videos (e.g., by performing the polarized screen matting techniques described herein frame by frame on the plurality of polarized digital videos). In some embodiments, the matte preparation system 102 includes the modified digital video in the training dataset, with an alpha matte video as the ground truth for the modified digital video.

To illustrate further, a machine learning model (e.g., a neural network) can be trained to prepare mattes for images and/or videos portraying foreground subjects. Thus, in some embodiments, the matte preparation system 102 compiles training data including modified digital images and/or modified digital videos with accompanying ground truth alpha mattes. As mentioned above, the matte preparation system 102 generates high-quality alpha mattes that outperform existing systems in terms of accuracy of the matte.

Experiments were performed to evaluate the performance of the matte preparation system 102. For example, the outputs of the matte preparation system 102 utilizing the polarimetric matting Laplacian model were compared to a similar technique utilizing a conventional (non-polarimetric) matting Laplacian model. The following table includes results on the test data, which indicate that the matte preparation system 102 improves over conventional techniques by using the polarimetric matting Laplacian model. In particular, the metrics used for evaluating the alpha mattes are mean absolute error (MAE), mean squared error (MSE), and gradient error (GRAD). For each metric, a lower value represents better performance.

|  | MAE | MSE | GRAD |
| --- | --- | --- | --- |
| Matte preparation with conventional matting Laplacian | 9.89 | 0.62 | 2.22 |
| Matte preparation system 102 with polarimetric matting Laplacian model | 7.65 | 0.28 | 0.72 |

Figure 7:
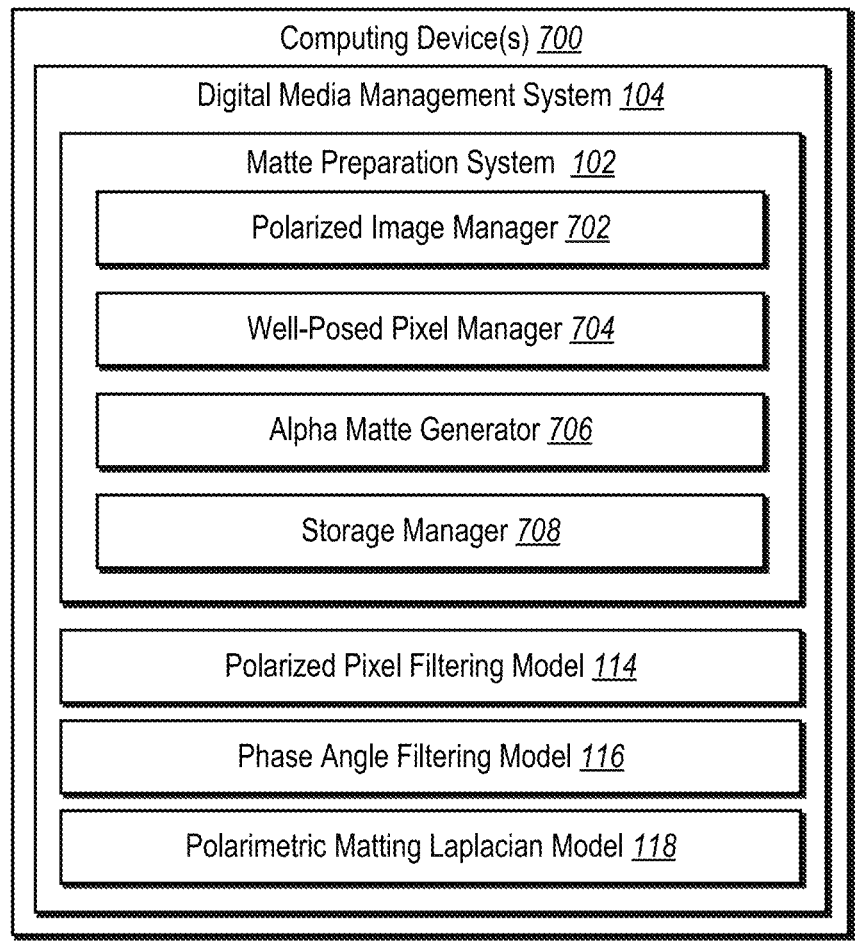
FIG. 7 illustrates a diagram of an example architecture of the matte preparation system in accordance with one or more embodiments.

Turning now to FIG. 7, additional detail will be provided regarding components and capabilities of one or more embodiments of the matte preparation system 102. In particular, FIG. 7 illustrates an example matte preparation system 102 executed by a computing device(s) 700 (e.g., the server device(s) 106 or the client device 108). As shown by the embodiment of FIG. 7, the computing device(s) 700 includes or hosts the digital media management system 104 and/or the matte preparation system 102. Furthermore, as shown in FIG. 7, the matte preparation system 102 includes a polarized image manager 702, a well-posed pixel manager 704, an alpha matte generator 706, and a storage manager 708. Additionally, in some embodiments, the computing device(s) 700 includes or hosts the polarized pixel filtering model 114, the phase angle filtering model 116, and/or the polarimetric matting Laplacian model 118.

As shown in FIG. 7, the matte preparation system 102 includes a polarized image manager 702. In some implementations, the polarized image manager 702 obtains digital images and/or digital videos. For example, the polarized image manager 702 obtains one or more pluralities of background images. Additionally, the polarized image manager 702 obtains one or more pluralities of polarized digital images (e.g., many frames of a plurality of polarized digital videos).

In addition, as shown in FIG. 7, the matte preparation system 102 includes a well-posed pixel manager 704. In some implementations, the well-posed pixel manager 704 determines well-posed pixels of a plurality of polarized digital images. For example, the well-posed pixel manager 704 utilizes a polarized pixel filtering model and/or a phase angle filtering model to determine well-posed pixels, as described above.

Moreover, as shown in FIG. 7, the matte preparation system 102 includes an alpha matte generator 706. In some implementations, the alpha matte generator 706 generates an alpha matte for a plurality of polarized digital images. For example, the alpha matte generator 706 estimates alpha matte values for well-posed pixels. Additionally, in some implementations, the alpha matte generator 706 propagates the alpha matte to other pixels utilizing a polarimetric matting Laplacian.

Furthermore, as shown in FIG. 7, the matte preparation system 102 includes a storage manager 708. In some implementations, the storage manager 708 stores information (e.g., via one or more memory devices) on behalf of the matte preparation system 102. For example, the storage manager 708 stores a plurality of polarized digital images, coordinate information for well-posed pixels within the plurality of polarized digital images, and alpha matte values for the plurality of polarized digital images.

Each of the components 702-708 of the matte preparation system 102 includes software, hardware, or both. For example, the components 702-708 include one or more instructions stored on a computer-readable storage medium and executable by processors of one or more computing devices, such as a client device or server device. When executed by the one or more processors, in some implementations, the computer-executable instructions of the matte preparation system 102 cause the computing device(s) to perform the methods described herein. Alternatively, in one or more implementations, the components 702-708 include hardware, such as a special purpose processing device to perform a certain function or group of functions. Alternatively, in some implementations, the components 702-708 of the matte preparation system 102 include a combination of computer-executable instructions and hardware.

Furthermore, the components 702-708 of the matte preparation system 102 are, for example, implemented as one or more operating systems, as one or more stand-alone applications, as one or more modules of an application, as one or more plug-ins, as one or more library functions, as one or more functions callable by other applications, and/or as a cloud-computing model. Thus, in some implementations, the components 702-708 are implemented as a stand-alone application, such as a desktop or mobile application. Furthermore, in various implementations, the components 702-708 are implemented as one or more web-based applications hosted on a remote server. In some implementations, the components 702-708 are implemented in a suite of mobile device applications or "apps." To illustrate, in some implementations, the components 702-708 are implemented in an application, including but not limited to Adobe After Effects, Adobe Creative Cloud, Adobe Lightroom, Adobe Photoshop, Adobe Premiere, Adobe Premiere Rush, and Adobe Sensei. The foregoing are either registered trademarks or trademarks of Adobe in the United States and/or other countries.

Figure 8:
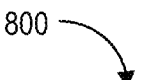
FIG. 8 illustrates a flowchart of a series of acts for generating alpha mattes for digital images in accordance with one or more embodiments.
Figure 8:
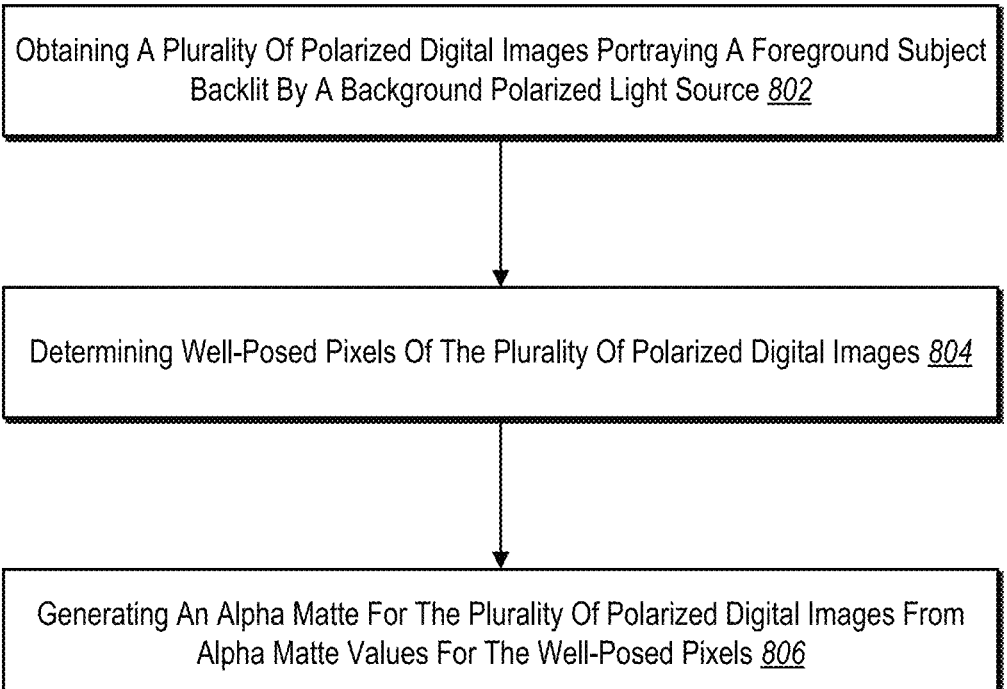

FIGS. 1-7, the corresponding text, and the examples provide a number of different methods, systems, devices, and non-transitory computer-readable media of the matte preparation system 102. In addition to the foregoing, one or more embodiments are described in terms of flowcharts comprising acts for accomplishing a particular result, as shown in FIG. 8. In some implementations, the processes of the matte preparation system 102 are performed with more or fewer acts. Furthermore, in various implementations, the acts are performed in differing orders. Additionally, in some implementations, the acts described herein are repeated or performed in parallel with one another or in parallel with different instances of the same or similar acts.

As mentioned, FIG. 8 illustrates a flowchart of a series of acts 800 for generating alpha mattes for digital images in accordance with one or more implementations. While FIG. 8 illustrates acts according to one implementation, alternative implementations omit, add to, reorder, and/or modify any of the acts shown in FIG. 8. In one or more implementations, the acts of FIG. 8 are performed as part of a method (e.g., a computer-implemented method). Alternatively, in one or more implementations, a non-transitory computer-readable storage medium comprises instructions that, when executed by one or more processors, cause a computing device to perform the acts of FIG. 8. In some implementations, a system performs the acts of FIG. 8.

As shown in FIG. 8, the series of acts 800 includes an act 802 of obtaining a plurality of polarized digital images portraying a foreground subject backlit by a background polarized light source, an act 804 of determining well-posed pixels of the plurality of polarized digital images, and an act 806 of generating an alpha matte for the plurality of polarized digital images from alpha matte values for the well-posed pixels.

In particular, in some implementations, the act 802 includes obtaining a plurality of background images of a background polarized light source and a plurality of polarized digital images portraying a foreground subject backlit by the background polarized light source, the act 804 includes determining well-posed pixels of the plurality of polarized digital images by: selecting, utilizing a polarized pixel filtering model, pixels devoid of polarized foreground light; or selecting, utilizing a phase angle filtering model, polarized pixels comprising phase angles of polarization distinct from a background phase angle of polarization in the plurality of background images, and the act 806 includes generating an alpha matte for the plurality of polarized digital images from alpha matte values for the well-posed pixels.

For example, in some implementations, the series of acts 800 includes selecting the pixels devoid of polarized foreground light by determining, for corresponding pixels of the plurality of polarized digital images, a polarized foreground intensity based on image intensities of the plurality of polarized digital images and background intensities of the plurality of background images. Moreover, in some implementations, the series of acts 800 includes selecting the pixels devoid of polarized foreground light further by comparing the polarized foreground intensity and an alpha matte value estimate with a threshold value.

Furthermore, in some implementations, the series of acts 800 includes determining the well-posed pixels of the plurality of polarized digital images by comparing, for corresponding pixels of the plurality of polarized digital images, a phase angle of polarization with a background phase angle of polarization of corresponding pixels of the plurality of background images.

Additionally, in some implementations, the series of acts 800 includes determining the alpha matte values for the well-posed pixels by combining, for corresponding pixels of the plurality of polarized digital images, image intensities of the plurality of polarized digital images with background intensities of the plurality of polarized digital images. Moreover, in some implementations, the series of acts 800 includes generating the alpha matte for the plurality of polarized digital images by propagating the alpha matte from the well-posed pixels to additional pixels by determining a polarimetric matting Laplacian for the plurality of polarized digital images based on image intensities for corresponding pixels of the plurality of polarized digital images and average image intensities over a local window comprising the corresponding pixels.

Furthermore, in some implementations, the series of acts 800 includes generating a modified digital image by combining foreground pixels of the plurality of polarized digital images portraying the foreground subject and a replacement background utilizing the alpha matte. Additionally, in some implementations, the series of acts 800 includes preparing a training dataset comprising the modified digital image and the alpha matte as a ground truth for the modified digital image.

In addition, in some implementations, the series of acts 800 includes obtaining a plurality of polarized digital images portraying a foreground subject backlit by a background polarized light source. Furthermore, in some implementations, the series of acts 800 includes determining, utilizing a polarized pixel filtering model, well-posed pixels of the plurality of polarized digital images by comparing a plurality of background images with the plurality of polarized digital images to select pixels devoid of polarized foreground light. Additionally, in some implementations, the series of acts 800 includes generating an alpha matte for the plurality of polarized digital images by: determining alpha matte values for the well-posed pixels of the plurality of polarized digital images; and propagating the alpha matte from the well-posed pixels to additional pixels of the plurality of polarized digital images.

For example, in some implementations, the series of acts 800 includes determining the well-posed pixels of the plurality of polarized digital images by determining, for corresponding pixels of the plurality of polarized digital images, a polarized foreground intensity based on image intensities of the plurality of polarized digital images and background intensities of the plurality of background images. Moreover, in some implementations, the series of acts 800 includes determining the well-posed pixels of the plurality of polarized digital images further by: comparing the polarized foreground intensity with a threshold value; and comparing a phase angle of polarization in the plurality of polarized digital images with a background phase angle of polarization of corresponding pixels of the plurality of background images.

Furthermore, in some implementations, the series of acts 800 includes determining the well-posed pixels of the plurality of polarized digital images by utilizing a phase angle filtering model to select foreground polarized pixels comprising phase angles of polarization distinct from a background phase angle of polarization. Additionally, in some implementations, the series of acts 800 includes determining the alpha matte values for the well-posed pixels of the plurality of polarized digital images by assigning a unity value to alpha matte values for the foreground polarized pixels.

Moreover, in some implementations, the series of acts 800 includes generating the alpha matte for the plurality of polarized digital images by: determining a polarimetric matting Laplacian for the plurality of polarized digital images based on image intensities for corresponding pixels of the plurality of polarized digital images and average image intensities over a local window comprising the corresponding pixels; and propagating the alpha matte from the well-posed pixels to additional pixels of the plurality of polarized digital images based on the polarimetric matting Laplacian.

Furthermore, in some implementations, the series of acts 800 includes generating, utilizing the alpha matte, a modified digital image by combining foreground pixels of the plurality of polarized digital images portraying the foreground subject and a replacement background. Additionally, in some implementations, the series of acts 800 includes preparing a training dataset comprising the modified digital image and the alpha matte as a ground truth for the modified digital image.

In addition, in some implementations, the series of acts 800 includes selecting the pixels devoid of polarized foreground light by: determining, for corresponding pixels of the plurality of polarized digital images, a polarized foreground intensity based on image intensities of the plurality of polarized digital images and background intensities of the plurality of background images; and comparing the polarized foreground intensity and an alpha matte value estimate with a threshold value. Moreover, in some implementations, the series of acts 800 includes determining the polarized foreground intensity by determining the alpha matte value estimate based on the image intensities of the plurality of polarized digital images and average background intensities for a set of multiple pluralities of background images.

Furthermore, in some implementations, the series of acts 800 includes selecting the polarized pixels comprising phase angles of polarization distinct from the background phase angle of polarization by comparing a phase angle difference with a threshold value. Additionally, in some implementations, the series of acts 800 includes generating the alpha matte for the plurality of polarized digital images by: determining the alpha matte values for the well-posed pixels; and determining additional alpha matte values for additional pixels of the plurality of polarized digital images based on the alpha matte values for the well-posed pixels and a polarimetric matting Laplacian for the plurality of polarized digital images. Furthermore, in some implementations, the series of acts 800 includes preparing a training dataset by generating a modified digital image from the plurality of polarized digital images and a replacement background utilizing the alpha matte.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
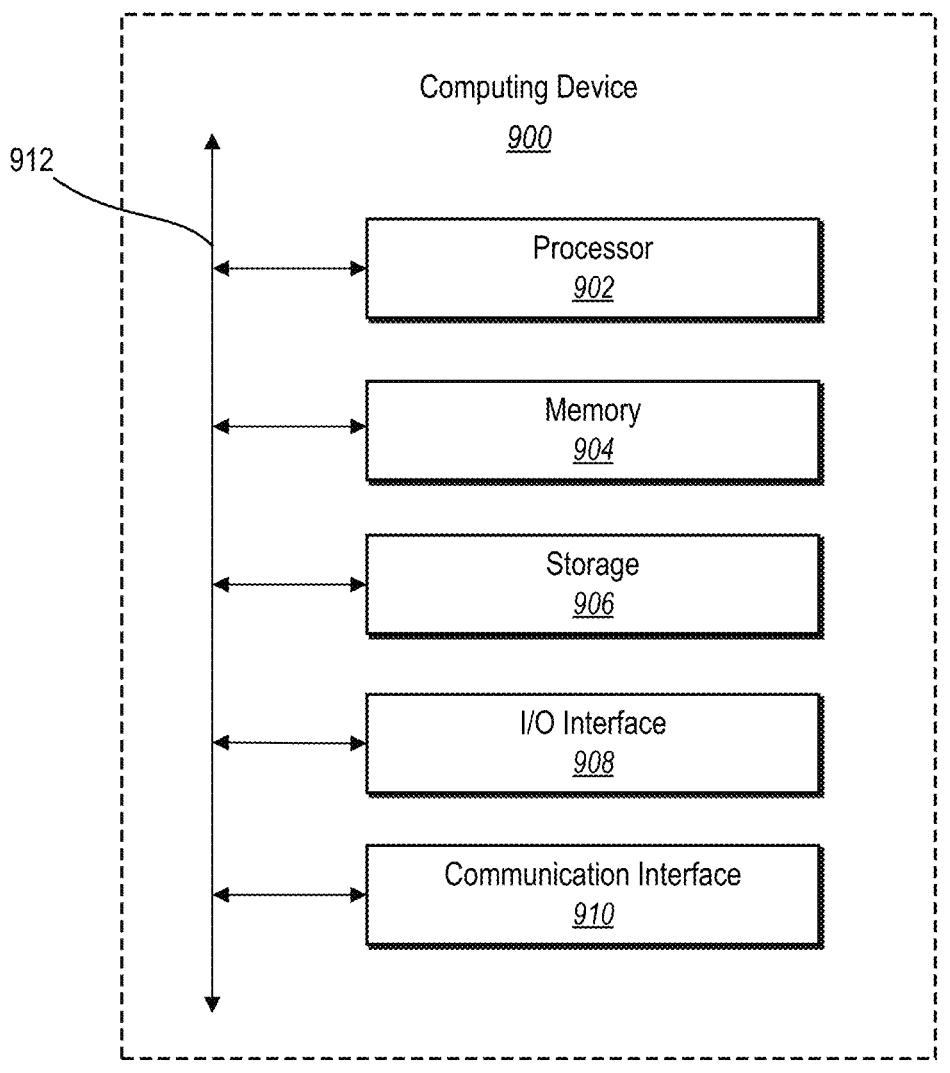
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900, may represent the computing devices described above (e.g., the computing device(s) 700, the server device(s) 106, or the client device 108). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments.

Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   obtaining a plurality of background images of a background polarized light source and a plurality of polarized digital images portraying a foreground subject backlit by the background polarized light source;
   determining well-posed pixels of the plurality of polarized digital images by:
      selecting, utilizing a polarized pixel filtering model, pixels devoid of polarized foreground light; or
      selecting, utilizing a phase angle filtering model, polarized pixels comprising phase angles of polarization distinct from a background phase angle of polarization in the plurality of background images; and
   generating an alpha matte for the plurality of polarized digital images from alpha matte values for the well-posed pixels.

2. The computer-implemented method of claim 1, wherein selecting the pixels devoid of polarized foreground light comprises determining, for corresponding pixels of the plurality of polarized digital images, a polarized foreground intensity based on image intensities of the plurality of polarized digital images and background intensities of the plurality of background images.

3. The computer-implemented method of claim 2, wherein selecting the pixels devoid of polarized foreground light further comprises comparing the polarized foreground intensity and an alpha matte value estimate with a threshold value.

4. The computer-implemented method of claim 1, wherein determining the well-posed pixels of the plurality of polarized digital images comprises comparing, for corresponding pixels of the plurality of polarized digital images, a phase angle of polarization with a background phase angle of polarization of corresponding pixels of the plurality of background images.

5. The computer-implemented method of claim 1, further comprising determining the alpha matte values for the well-posed pixels by combining, for corresponding pixels of the plurality of polarized digital images, image intensities of the plurality of polarized digital images with background intensities of the plurality of polarized digital images.

6. The computer-implemented method of claim 1, wherein generating the alpha matte for the plurality of polarized digital images comprises propagating the alpha matte from the well-posed pixels to additional pixels by determining a polarimetric matting Laplacian for the plurality of polarized digital images based on image intensities for corresponding pixels of the plurality of polarized digital images and average image intensities over a local window comprising the corresponding pixels.

7. The computer-implemented method of claim 1, further comprising generating a modified digital image by combining foreground pixels of the plurality of polarized digital images portraying the foreground subject and a replacement background utilizing the alpha matte.

8. The computer-implemented method of claim 7, further comprising preparing a training dataset comprising the modified digital image and the alpha matte as a ground truth for the modified digital image.

9. A system comprising:
   one or more memory devices; and
   one or more processors coupled to the one or more memory devices that cause the system to perform operations comprising:
      obtaining a plurality of polarized digital images portraying a foreground subject backlit by a background polarized light source;
      determining, utilizing a polarized pixel filtering model, well-posed pixels of the plurality of polarized digital images by comparing a plurality of background images with the plurality of polarized digital images to select pixels devoid of polarized foreground light; and
      generating an alpha matte for the plurality of polarized digital images by:
         determining alpha matte values for the well-posed pixels of the plurality of polarized digital images; and
         propagating the alpha matte from the well-posed pixels to additional pixels of the plurality of polarized digital images.

10. The system of claim 9, wherein determining the well-posed pixels of the plurality of polarized digital images comprises determining, for corresponding pixels of the plurality of polarized digital images, a polarized foreground intensity based on image intensities of the plurality of polarized digital images and background intensities of the plurality of background images.

11. The system of claim 10, wherein determining the well-posed pixels of the plurality of polarized digital images further comprises:
   comparing the polarized foreground intensity with a threshold value; and comparing a phase angle of polarization in the plurality of polarized digital images with a background phase angle of polarization of corresponding pixels of the plurality of background images.

12. The system of claim 9, wherein:

determining the well-posed pixels of the plurality of polarized digital images comprises utilizing a phase angle filtering model to select foreground polarized pixels comprising phase angles of polarization distinct from a background phase angle of polarization; and determining the alpha matte values for the well-posed pixels of the plurality of polarized digital images comprises assigning a unity value to alpha matte values for the foreground polarized pixels.

13. The system of claim 9, wherein generating the alpha matte for the plurality of polarized digital images comprises:

determining a polarimetric matting Laplacian for the plurality of polarized digital images based on image intensities for corresponding pixels of the plurality of polarized digital images and average image intensities over a local window comprising the corresponding pixels; and propagating the alpha matte from the well-posed pixels to additional pixels of the plurality of polarized digital images based on the polarimetric matting Laplacian.

14. The system of claim 9, wherein the operations further comprise:

generating, utilizing the alpha matte, a modified digital image by combining foreground pixels of the plurality of polarized digital images portraying the foreground subject and a replacement background; and preparing a training dataset comprising the modified digital image and the alpha matte as a ground truth for the modified digital image.

15. A non-transitory computer-readable medium storing instructions thereon that, when executed by at least one processor, cause the at least one processor to perform operations comprising:

obtaining a plurality of background images of a background polarized light source and a plurality of polarized digital images portraying a foreground subject backlit by the background polarized light source;

determining well-posed pixels of the plurality of polarized digital images by:

selecting, utilizing a polarized pixel filtering model, pixels devoid of polarized foreground light; or selecting, utilizing a phase angle filtering model, polarized pixels comprising phase angles of polarization distinct from a background phase angle of polarization in the plurality of background images; and generating an alpha matte for the plurality of polarized digital images from alpha matte values for the well-posed pixels.

16. The non-transitory computer-readable medium of claim 15, wherein selecting the pixels devoid of polarized foreground light comprises:

determining, for corresponding pixels of the plurality of polarized digital images, a polarized foreground intensity based on image intensities of the plurality of polarized digital images and background intensities of the plurality of background images; and comparing the polarized foreground intensity and an alpha matte value estimate with a threshold value.

17. The non-transitory computer-readable medium of claim 16, wherein determining the polarized foreground intensity comprises determining the alpha matte value estimate based on the image intensities of the plurality of polarized digital images and average background intensities for a set of multiple pluralities of background images.

18. The non-transitory computer-readable medium of claim 15, wherein selecting the polarized pixels comprising phase angles of polarization distinct from the background phase angle of polarization comprises comparing a phase angle difference with a threshold value.

19. The non-transitory computer-readable medium of claim 15, wherein generating the alpha matte for the plurality of polarized digital images comprises:

determining the alpha matte values for the well-posed pixels; and determining additional alpha matte values for additional pixels of the plurality of polarized digital images based on the alpha matte values for the well-posed pixels and a polarimetric matting Laplacian for the plurality of polarized digital images.

20. The non-transitory computer-readable medium of claim 15, wherein the operations further comprise preparing a training dataset by generating a modified digital image from the plurality of polarized digital images and a replacement background utilizing the alpha matte.

* * * * *